(12) United States Patent
Kimura et al.

(10) Patent No.: US 7,096,237 B2
(45) Date of Patent: *Aug. 22, 2006

(54) RECORDING AND/OR REPRODUCTION APPARATUS, FILE MANAGEMENT METHOD AND PROVIDING MEDIUM

(75) Inventors: Tetsu Kimura, Kanagawa (JP); Akio Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 587 days.

This patent is subject to a terminal disclaimer.

(21) Appl. No.: 10/057,011

(22) Filed: Jan. 25, 2002

(65) Prior Publication Data

US 2002/0111957 A1 Aug. 15, 2002

(30) Foreign Application Priority Data

Oct. 21, 1997 (JP) .................................... 9-288178
Feb. 27, 1998 (JP) ................................. 10-046855

(51) Int. Cl.
*G06F 17/00* (2006.01)
*G11B 21/08* (2006.01)
*H04N 5/85* (2006.01)

(52) U.S. Cl. .................... 707/205; 369/30.04; 386/125
(58) Field of Classification Search ............. 369/33.01, 369/30.04, 47.24; 368/95, 125, 126; 707/205, 707/104.1; 714/6
See application file for complete search history.

(56) References Cited

U.S. PATENT DOCUMENTS

| | | |
|---|---|---|
| 4,616,319 A | 10/1986 | Peters et al. |
| 4,984,230 A | 1/1991 | Satoh et al. |
| 5,257,141 A | 10/1993 | Matsumi et al. |
| 5,475,668 A | 12/1995 | Azumatani et al. |
| 5,550,640 A | 8/1996 | Tsuboi et al. |
| 5,638,386 A | 6/1997 | Tsunoda et al. |
| 5,740,435 A | 4/1998 | Yamamoto et al. |
| 5,761,526 A | 6/1998 | Sakakura et al. |
| 5,778,142 A | 7/1998 | Taira et al. |
| 5,818,799 A | 10/1998 | Kondo et al. |
| 5,822,493 A | 10/1998 | Uehara et al. |
| 5,930,226 A * | 7/1999 | Togawa .................... 369/33.01 |
| 5,933,570 A | 8/1999 | Fujita |
| 5,937,427 A | 8/1999 | Shinagawa et al. |
| 5,940,854 A | 8/1999 | Green, Jr. et al. |
| 5,946,277 A | 8/1999 | Kuroda et al. |
| 5,974,217 A | 10/1999 | Haraguchi |
| 5,978,336 A | 11/1999 | Mine et al. |
| 6,118,924 A | 9/2000 | Nakatani et al. |

(Continued)

FOREIGN PATENT DOCUMENTS

EP 0 350 920 1/1990

(Continued)

OTHER PUBLICATIONS

Patent Abstracts of Japan, vol. 1997, No. 01, Jan. 31, 1997, JP 08 227577.

(Continued)

*Primary Examiner*—Uyen Le
(74) *Attorney, Agent, or Firm*—Frommer Lawrence & Haug LLP; William S. Frommer; Thomas F. Presson

(57) ABSTRACT

The invention provides a file system which can record and/or record AV signals simply onto and/or from a disc in a home. The file system is incorporated in a recording and/or reproduction apparatus which uses a disc type recording medium, and records management information for management of a file of AV data to at least two locations of a logical volume.

4 Claims, 24 Drawing Sheets

U.S. PATENT DOCUMENTS 6,122,646 A    9/2000  Igarashi et al.

FOREIGN PATENT DOCUMENTS

| EP | 0 635 835 | 1/1995 |
|----|-----------|--------|
| EP | 0 718 845 | 6/1996 |
| EP | 0 862 180 | 9/1998 |

OTHER PUBLICATIONS

Devoy J C et al: "Media, File Management Schemes Facilitate Worm Utilization" Computer Technology Review, US, Westworld Production Co. Los Angeles, vol. 8, No. 13, pp. 48-49, XP 000120798.

"DVD Read-Only Disk File System Specifications" ECMA Technical Report, No. TR/71, Feb. 1998, XP002123679.

* cited by examiner

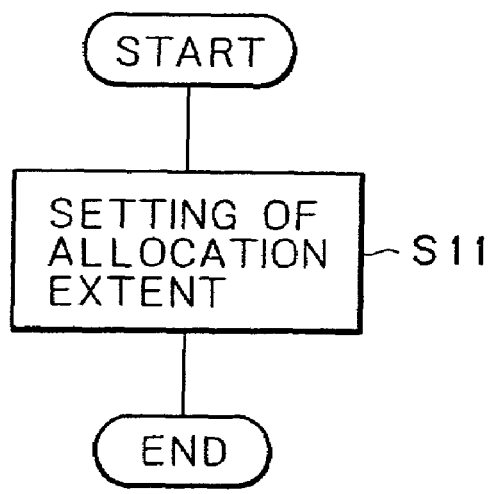
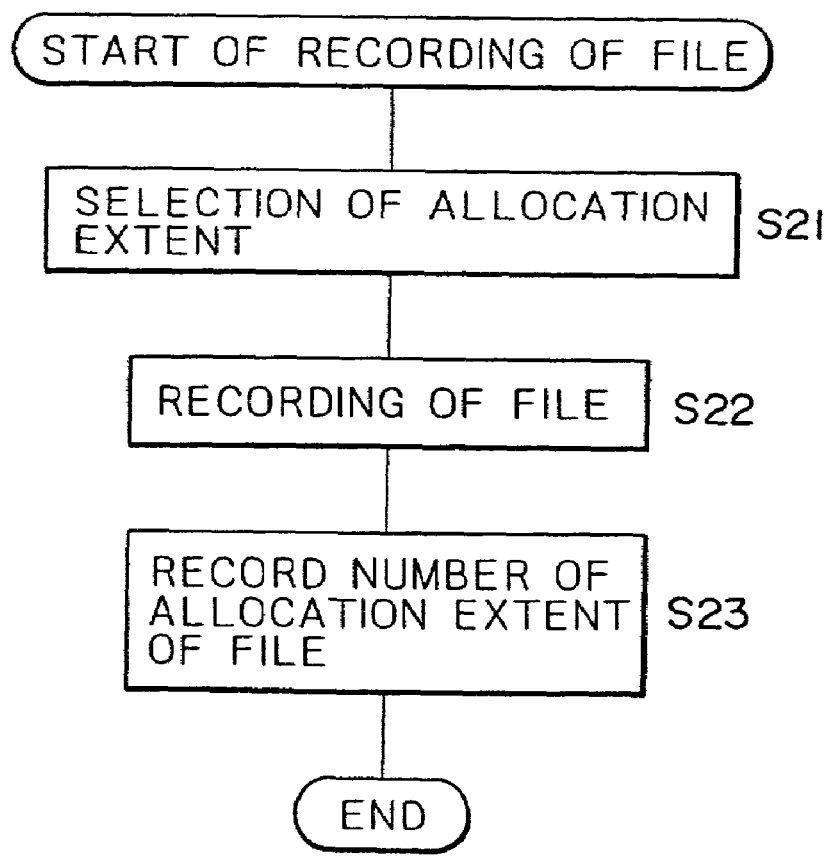

FIG. 8

<Spare Area Information>0+

[Logical Volume Information] {

<Logical Volume Information Header>

<Partition Map>+1

} 1+

[Defect List information] {

<Defect List Information Header>

[Defect Lists] {

@APS<Primary Defect List>0+1

@APS<Secondary Defect List>0+1

[Media Information Descriptor] {

<Media Information Descriptor Header>

<Zone Information>0+

[Drive Information Descriptor]

<Drive Information Descriptor Header>

}

[Extended Data Descriptor] {
    <Extended Data Descriptor Header>
    [Extended Data Set] {
        @APS<Extended Data>0+
    }
}

Root File Record

Child Link   Next Link   Parent Link

```
[File Table] {
    <File Table Header>
    <File Table Data>
}
```

```
[File Table] {
    <File Table Header>
    <File Record> 1+
}
```

```
[Allocation Extents Table] {
    <Allocation Extents Table Header>
    <Allocation Extent Record> 0+
}
```

FIG. 17

```
[Allocation Strategy Table] {
    < Allocation Strategy Table Header >
    < Allocation Strategy Record > 1+
}
```

FIG. 18

```
[Extended Attribute Table] {
    < Extended Attribute Table Header >
    < Extended Attribute Record > 1+
}
```

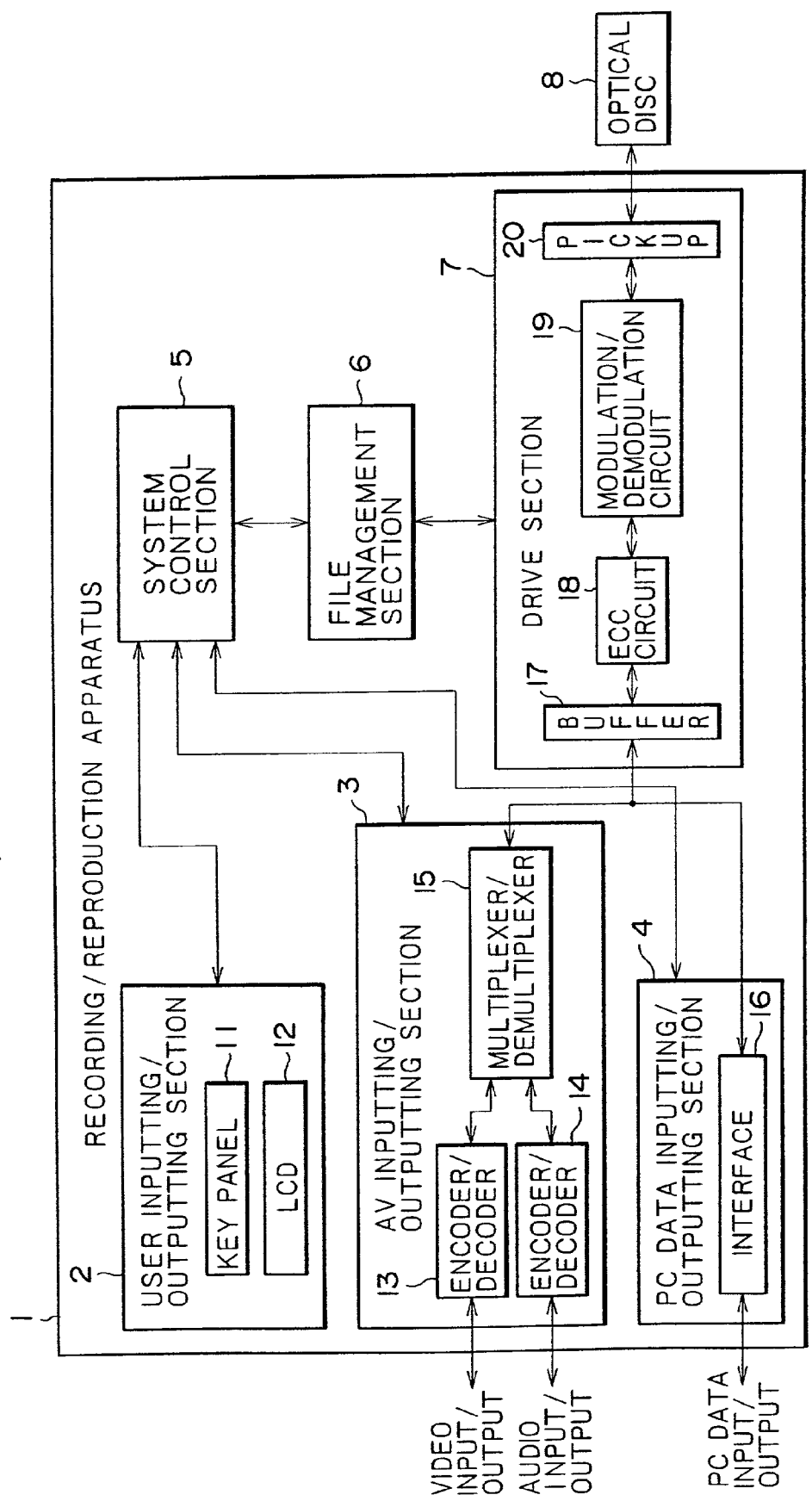

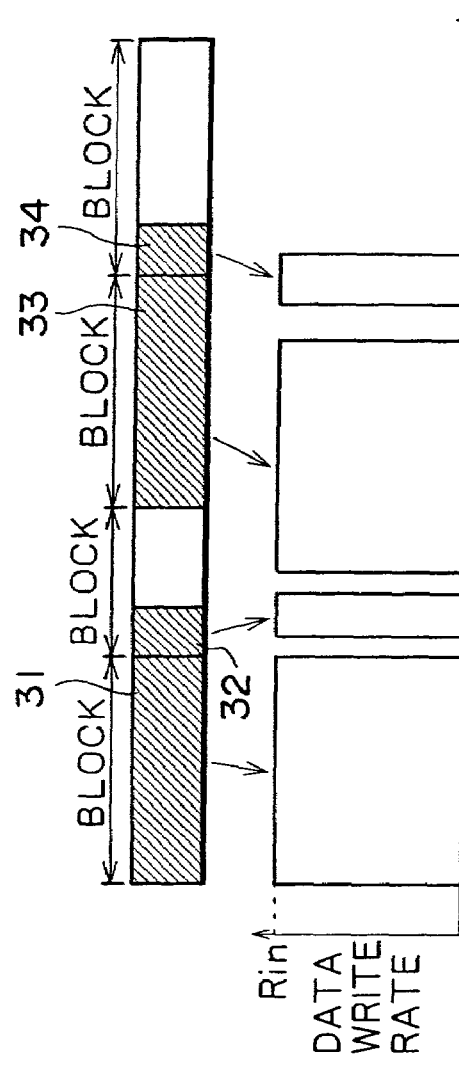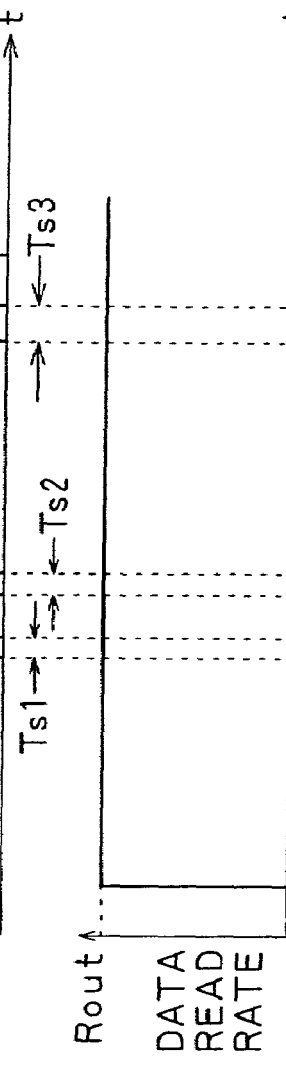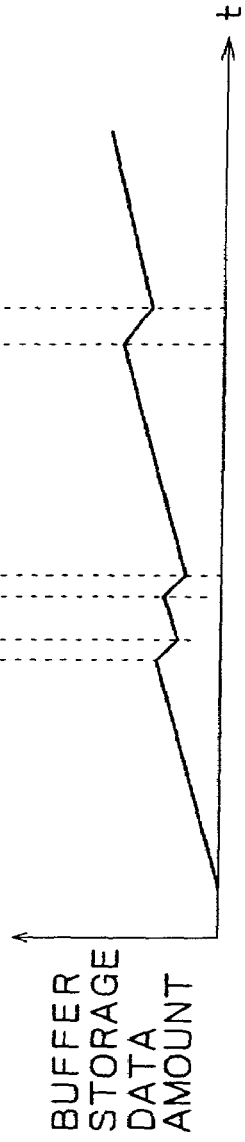
FIG. 22A  FIG. 22B  FIG. 22C  FIG. 22D

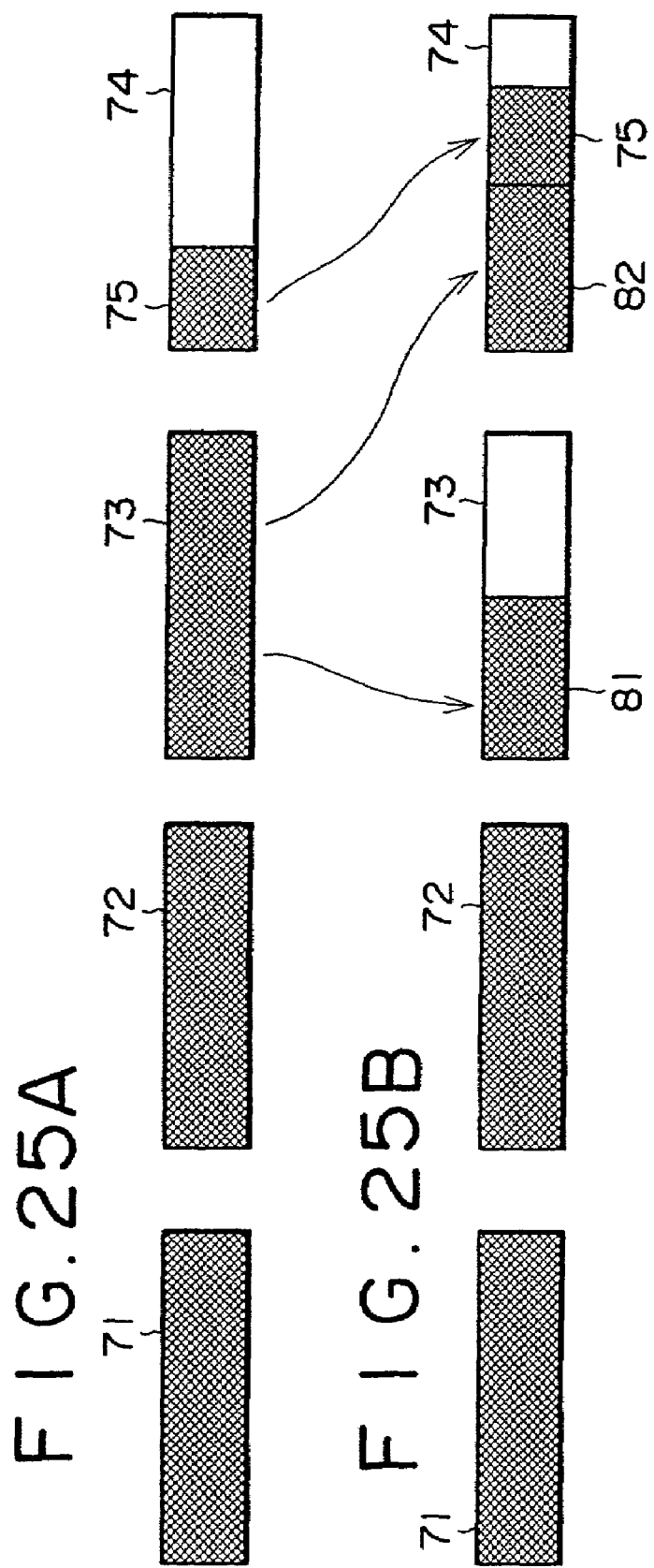

RECORDING AND/OR REPRODUCTION APPARATUS, FILE MANAGEMENT METHOD AND PROVIDING MEDIUM

BACKGROUND OF THE INVENTION

This invention relates to a recording and/or reproduction apparatus, a file management method and a providing medium, and more particularly to a file system to be used for a recording and/or reproduction apparatus (VDR: Video Disc Recorder) in which a disc type recording medium is used.

As a file system for recording data onto a disc type recording medium, the ISO/IEC13346, 1995, "Information technology—Volume and file structure of write-once and rewritable media using non-sequential recording for information interchange" is known. This file system is a general purpose file system for recording various data and is not intended to be used by an individual to record compressed digital AV (audio and vide) signals onto a disc in a home. Therefore, the system is not necessarily satisfactory to record compressed digital AV (audio and video) signals. Accordingly, a file system and a volume optimum to record AV signals are demanded.

SUMMARY OF THE INVENTION

It is an object of the present invention to provide a recording and/or reproduction apparatus, a file management method and a providing medium which can be applied to a file system with which an individual can record and reproduce AV signals onto and from a disc readily in a home.

In order to attain the object described above, according to an aspect of the present invention, there is provided a recording and/or reproduction apparatus for recording and/or reproducing AV data onto and/or from a disc type recording medium, comprising first recording means for recording a file of AV data, and second recording means for recording management information for the file to at least two locations of a logical volume.

According to another aspect of the present invention, there is provided a file management method for a recording and/or reproduction apparatus for recording and/or reproducing AV data onto and/or from a disc type recording medium, comprising a first recording step of recording a file of AV data, and a second recording step of recording management information for the file to at least two locations of a logical volume.

According to a further aspect of the present invention, there is provided a providing medium for providing a program which can be read by a computer for causing a recording and/or reproduction apparatus for recording and/or reproducing AV data onto and/or from a disc type recording medium to execute a first recording step of recording a file of AV data, and a second recording step of recording management information for the file to at least two locations of a logical volume.

In the recording and/or reproduction apparatus, the file management method and the providing medium, a file of AV data is recorded and management information is recorded to at least two locations of a logical volume. Consequently, an individual can record and/or reproduce compressed video and audio signals simply in a home.

According to a still further aspect of the present invention, there is provided a recording and/or reproduction apparatus, comprising unit recording means for recording units of information which can be recorded onto a disc type recording medium, setting means for setting lengths of the units of information to be recorded by the unit recording means, and identification information recording means for recording, in response to a file recorded on the disc type recording medium, identification information for identification of the length of the unit adopted when the file is recorded from among the units of the length set by the setting means.

According to a yet further aspect of the present invention, there is provided a file management method for a recording and/or reproduction apparatus for recording and/or reproducing information onto and/or from a disc type recording medium, comprising a unit recording step of recording units of information which can be recorded onto the disc type recording medium, a setting step of setting lengths of units of information to be recorded in the unit recording step, and an identification information recording step of recording, in response to a file recorded on the disc type recording medium, identification information for identification of the length of the unit adopted when the file is recorded from among the units of the length set by the setting means.

According to a yet further aspect of the present invention, there is provided a providing medium for providing a program which can be read by a computer for causing a recording and/or reproduction apparatus for recording and/ or reproducing AV data onto and/or from a disc type recording medium to execute a unit recording step of recording units of information which can be recorded onto the disc type recording medium, a setting step of setting lengths of units of information to be recorded in the unit recording step, and an identification information recording step of recording, in response to a file recorded on the disc type recording medium, identification information for identification of the length of the unit adopted when the file is recorded from among the units of the length set by the setting means.

In the recording and/or reproduction apparatus, the file management method and the providing medium, units of recordable information are recorded onto a disc type recording medium and the lengths of the units of information to be recorded are set and then, in response to a file to be recorded onto the disc type recording medium, the length of a unit adopted when the file is recorded is identified from among the set units of the length. Consequently, an individual can record and/or reproduce compressed video and audio signals simply in a home.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a flow chart illustrating a procedure of setting the length of an allocation extent;

FIG. 6 is a flow chart illustrating a procedure of recording a file;

FIG. 8 is a view illustrating a volume structure descriptor;

FIG. 9 is a view illustrating a media information descriptor;

FIG. 10 is a view illustrating a drive information descriptor;

FIG. 17 is a view illustrating an allocation strategy table;

FIG. 18 is a view illustrating an extended attribute table;

FIG. 19 is a block diagram showing a construction of a recording and/or reproduction apparatus to which the present invention is applied;

FIGS. 22A, 22B, 22C and 22D are diagrams illustrating a construction of a file used in the recording and/or reproduction apparatus of FIG. 19 and the amount of data stored in the buffer;

FIGS. 25A and 25B are diagrammatic views illustrating processing recording a file into blocks;

DESCRIPTION OF THE PREFERRED EMBODIMENT

Figure 1:
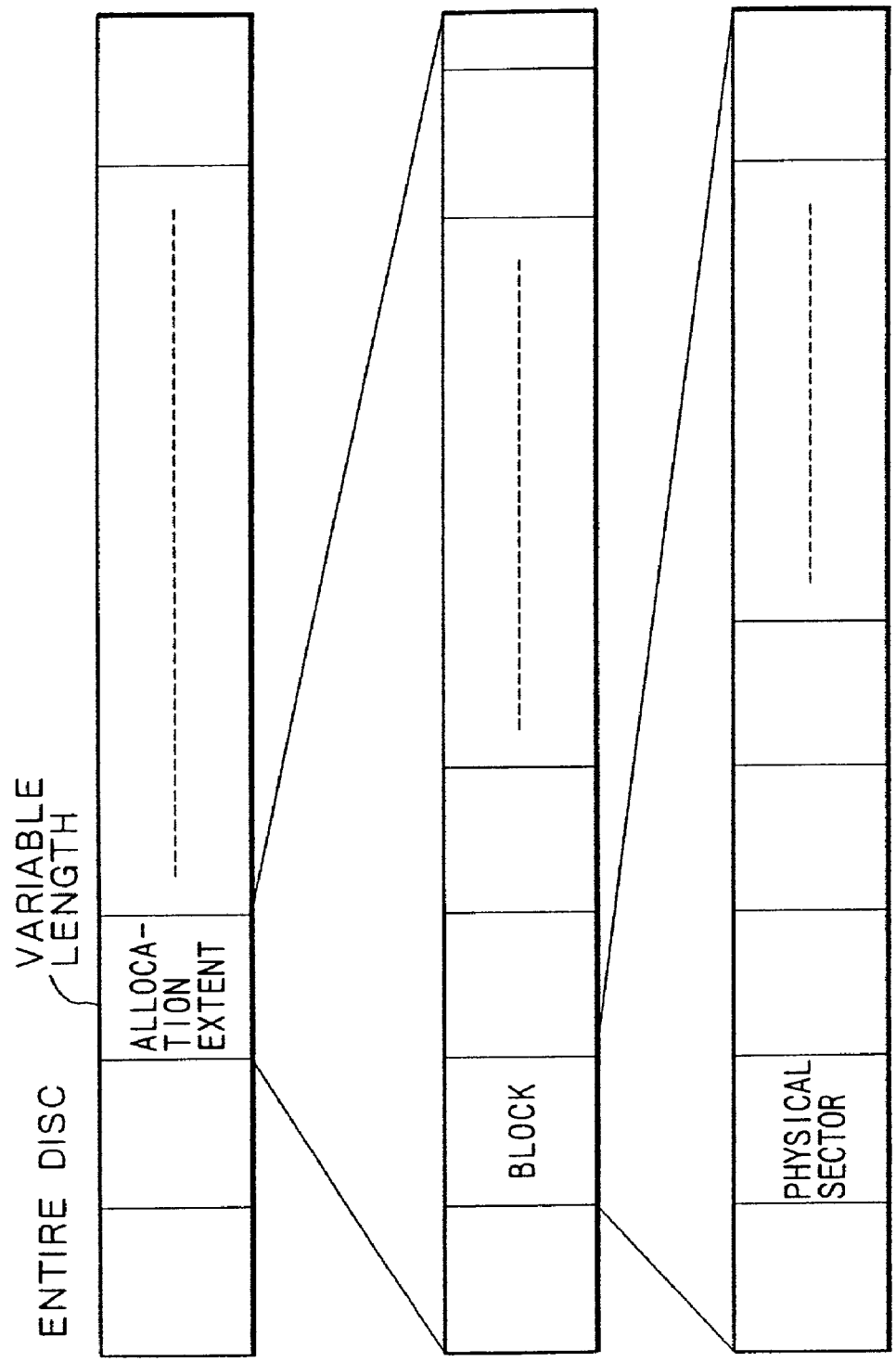
FIG. 1 is a diagrammatic view illustrating a format of an entire disc type recording medium.

First, a format system for a disc type recording medium to which the present invention is applied is described. Referring to FIG. 1, there is illustrated a format of an entire recording medium. The recording medium, that is, disc, is divided into a plurality of allocation extents having variable lengths. Each of the allocation extents is composed of a plurality of blocks having a fixed length. Each of the blocks is composed of a predetermined number of physical sectors.

Figure 2:
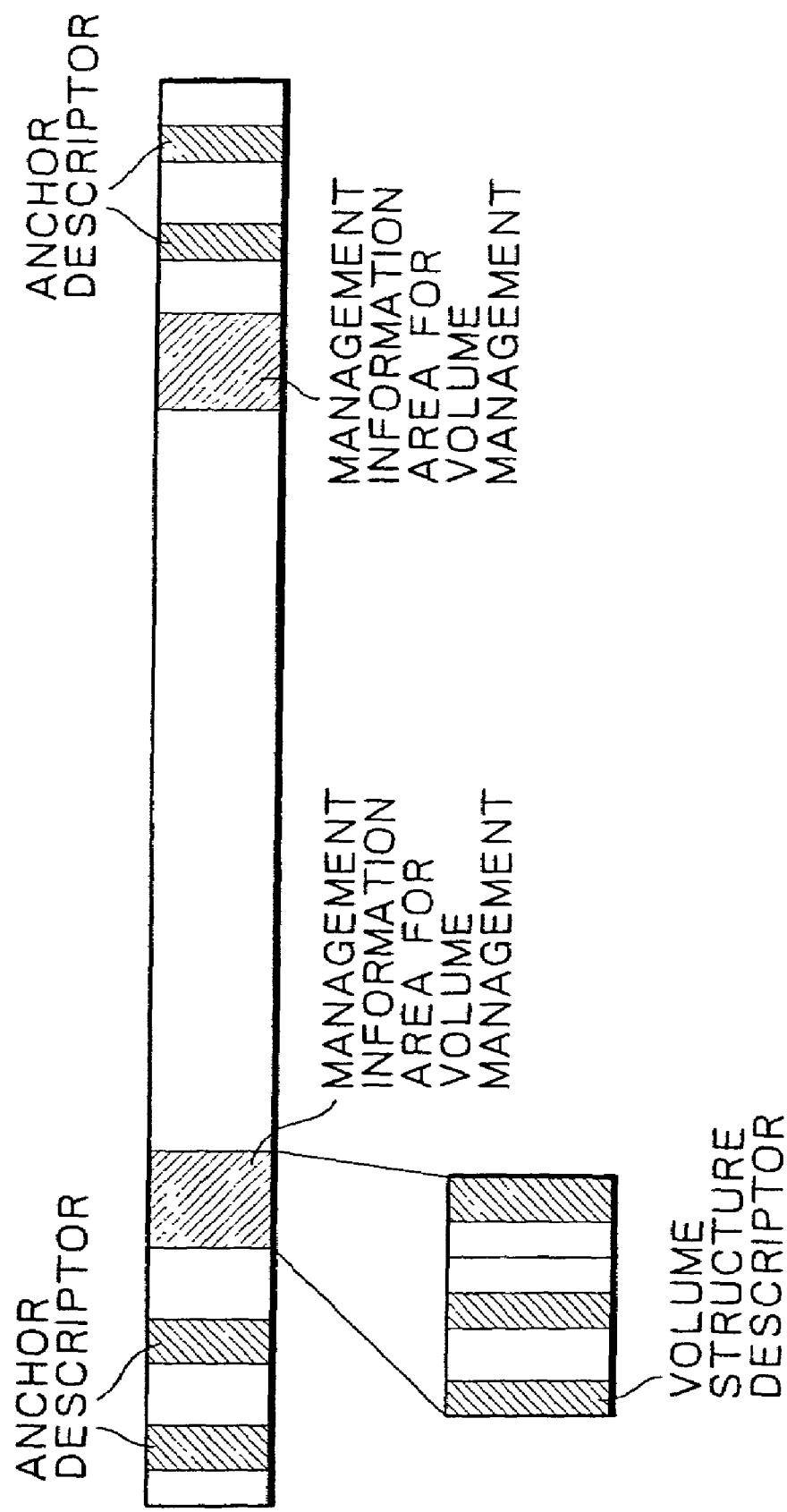
FIG. 2 is a diagrammatic view illustrating an anchor descriptor.

FIG. 2 illustrates an anchor descriptor. Referring to FIG. 2, the disc has four anchor descriptors arranged thereon. Each of the anchor descriptors has positions of management information areas for volume management recorded thereon. A volume structure descriptor in the management information areas for volume management includes physical volume information, partition information, logical volume information and a partition map.

Figure 3:
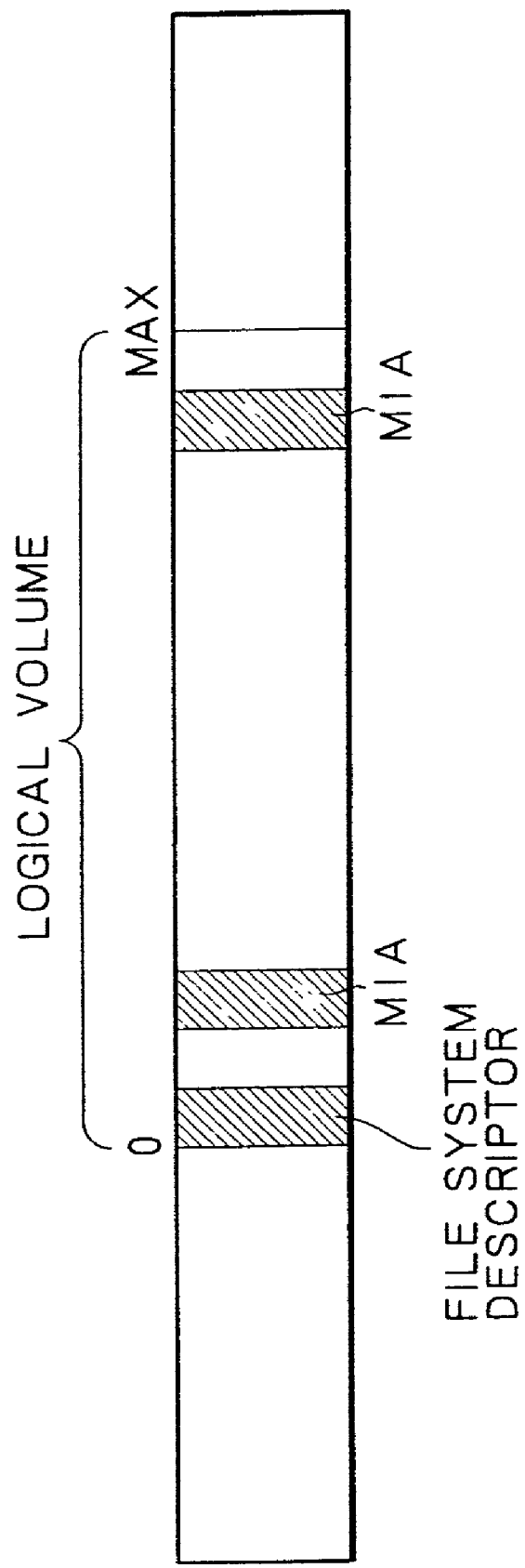
FIG. 3 is a diagrammatic view illustrating a logical volume.

The volume structure descriptor has a logical volume as a user area described therein. The logical volume is illustrated in FIG. 3. Referring to FIG. 3, a file system descriptor is arranged in the logical volume. An MIA (Management Information Area) is disposed in the proximity of the top and the end of the logical volume. Each of the MIAs includes a file table, an allocation extent table, an allocation strategy table, a defect information table, and an extended attribute table. The lengths of the allocation extents are described in allocation strategy records which form the allocation strategy table.

A user sets the lengths of allocation extents of data of a file to be recorded onto a disc before the data are recorded onto the disc. This allows, for example, for AV data to be recorded in a format of allocation extents of a comparatively large length and for PC data to be recorded in another format of allocation extents of a comparatively small length. Since AV data are in most cases continuous data, data can be recorded and reproduced in a comparatively high efficiency where the length of allocation extents is comparatively long.

Figure 5:
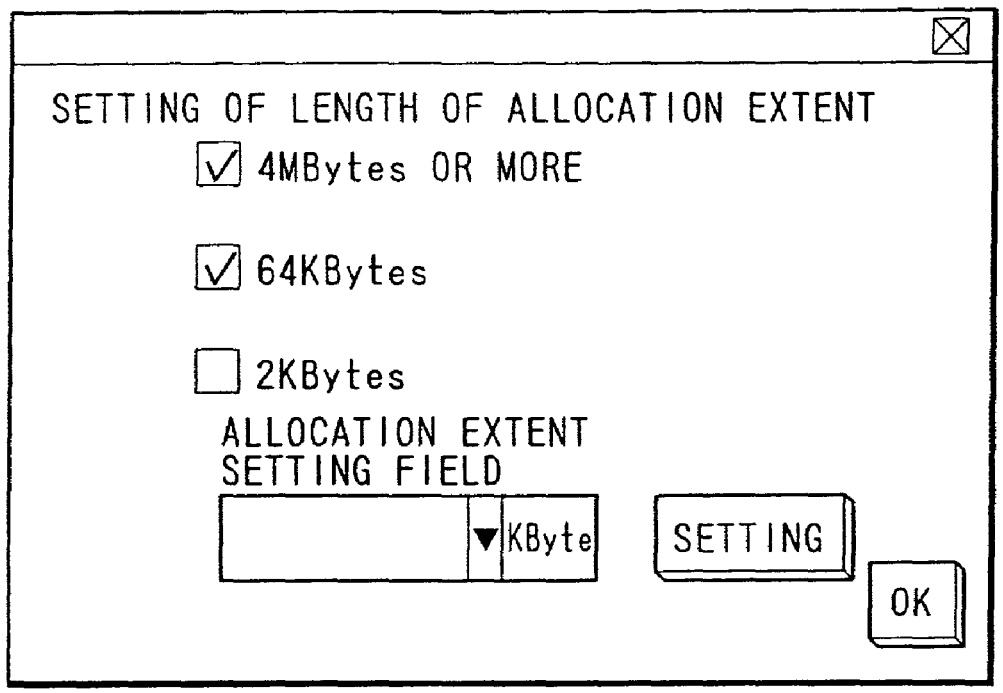
FIG. 5 is a schematic view showing an example of a screen to be used to set the length of an allocation extent.

FIG. 4 illustrates a procedure of setting the length of allocation extents. Referring to FIG. 4, in step S11, a drive unit 7 which will be hereinafter described with reference to FIG. 19 records an allocation strategy record corresponding to a set length of allocation extents into the allocation strategy tables included in the MIAs. A plurality of allocation strategy records can be written into the allocation strategy tables. FIG. 5 shows an example of a screen to be used for a user to set the length of allocation extents. For the length of allocation extents, an arbitrary length such as 4 MBytes or more, 64 KBytes, or 2 KBytes can be selectively set. In this instance, a plurality of different lengths can be set. The disc allows recording only in a designated one of the formats for allocation extents of the lengths set in this manner in advance.

Figure 7:
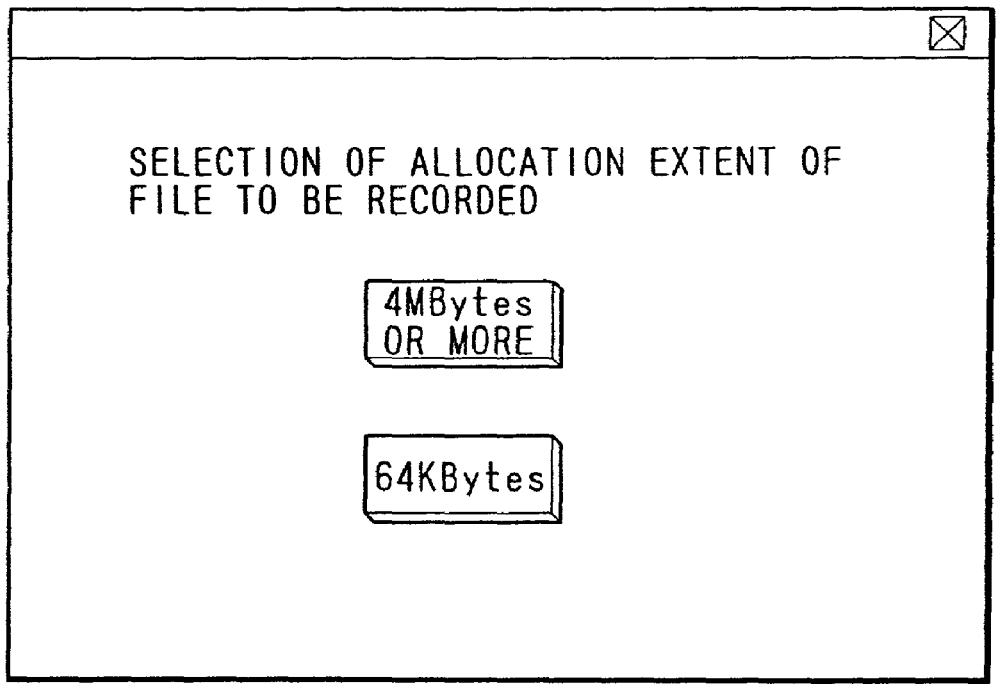
FIG. 7 is a schematic view showing a screen to be used to select the length of an allocation extent.

Processing when data are recorded onto a disc after a length of allocation extents is set and recorded onto the disc proceeds in such manner as illustrated in a flow chart of FIG. 6. Referring to FIG. 6, first in step S21, a user will select a length of allocation extents of data to be recorded subsequently. FIG. 7 shows an example of a screen to be used to select a length of allocation extents. For such length, only values set in advance to the disc are displayed. The user will manually operate a button displayed on the screen to select a length of allocation extents corresponding to the button. By designating a greater length for allocation extents when AV data are to be recorded than that when PC data are to be recorded, recording of data of a comparatively high efficiency is allowed. By the designation of a length for allocation extents, the allocation strategy record arranged in the allocation strategy tables is designated. After the designation is completed, the drive unit 7 records inputted data onto the disc in step S22. After the recording of data is completed, the drive unit 7 records, in step 23, a number corresponding to the length of the allocation extents of the file onto the disc. A file management unit 6 which will be hereinafter described with reference to FIG. 19 knows the number corresponding to the length of the allocation extents and can thereafter utilize contents of a corresponding one of allocation strategy records.

When a system control unit 5 which will be hereinafter described with reference to FIG. 19 can discriminate whether AV data are to be recorded or PC data are to be recorded, the processing in step S21 described above may be performed without receiving an input from the user.

A file is recorded onto the disc in such a manner as described above.

Now, a construction of a volume is described. The Disc Extent is used to represent an area aligned with an MIB (Management Information Block) in a descriptor recorded in the MIAs which will be hereinafter described. The Disc Extent is recorded in such a form as illustrated in Table 1 below.

TABLE 1

Desc Extent

| RBP | Length | Name | Contents |
|-----|--------|------|----------|
| 0 | 2 | Offset(Number of MIB)from top of a descriptor | Uint16 |
| 2 | 2 | Length(Number of MIB) | Uint16 |

The Offset from Top of a descriptor (RBP 0) designates an offset (MIB number) from the top MIB to the area of the descriptor. The Length (RBP 2) designates a magnitude (MIB number) of the area.

The PDL Entry (Primary Defect List Entry) is used to record a physical sector size of a physical sector for which slipping is performed in defect management. The PDL Entry is recorded in a form indicated in Table 2 below.

TABLE 2

PDL Entry

| RBP | Length | Name | Contents |
|-----|--------|------|----------|
| 0 | 4 | Physical Sector Number of Defect Sector | Uint32 |

The Physical Sector Number of Defect Sector (RBP 0) designates a physical sector number of a physical sector for which slipping is performed.

The SDL Entry (Secondary Defect List Entry) is used to record the physical sector number of a physical sector for which linear placement is performed in defect management and the physical sector number of another physical sector to be used as a substitute for the physical sector. The SDL Entry is recorded in a form indicated in Table 3 below.

TABLE 3

SDL Entry

| RBP | Length | Name | Contents |
|-----|--------|------|----------|
| 0 | 4 | Physical Sector Number of Defect Sector | Uint32 |
| 4 | 4 | Physical Sector Number of Spare Sector | Uint32 |

The Physical Sector Number of Defect Sector of Table 3 above designates the physical sector number of a physical sector for which linear replacement is performed. The Physical Sector Number of Spare Sector (RBP 4) designates the physical sector number of a substitute physical sector to be used in linear replacement.

The Anchor Points represents start points of volume structure analyses. In the Anchor Points, an Anchor Descriptor is recorded. The physical sector number of a physical sector which makes an anchor point is not prescribed.

However, in a VDR, the following prescriptions are used. In particular, in the case of a ROM (Read Only Memory) disc or a RAM (Random Access Memory) disc, Ch, 20h, LPSN (Last Physical Sector Number)-20h, LPSN-Ch (any value having the suffix h represents that it is a hexadecimal number) are determined as anchor points. In the case of a partial ROM disc, Ch, 20h, LPSN-20h and LPSN-Ch in ROM and RAM areas are determined as anchor points. In this instance, where appropriate information is recorded at the anchor points of the RAM area, the information is used, but where appropriate information is not recorded, the information in the ROM area is used.

An anchor descriptor is recorded in a physical sector, which serves as an anchor point, beginning with the byte position 0. The magnitude of the anchor descriptor is equal to or smaller than the physical sector size. Further, the area from a byte next to the last byte of the descriptor to the last byte of the physical sector is reserved for possible extension in the future, and #00 is set to all bytes in the area. The anchor descriptor has recorded therein a definition of a main MIA area and a definition of a reserve MIA area, positions of respective MIA maps and so forth.

Various pieces of information regarding a volume are recorded in a management information area (MIA) for volume management. In order to secure the reliability, two MIAs having information of the same contents are recorded at different locations on the physical volume, and are individually referred to as main MIA and reserve MIA. A physical sector in each MIA is called management information block (MIB) and an offset of the physical sector number of a physical sector from the top MIB of the MIA is called management information block number (MIB number). For designation of an MIB, the MIB number of it is used. Each MIA is composed of MIBs which cannot be used because of a defect or the like, unused MIBs, and MIBs used to record data of an MIA map for the main MIA (MIA Map for Main MIA), an MIA map for the reserve MIA (MIA Map for Reserve MIA), a Volume Structure Descriptor, a Media Information Descriptor, a Drive Information Descriptor and an Extended Data Descriptor.

For what object an MIB in an MIA is used is recorded in an MIA map. Start positions and magnitudes of the main MIA and the reserve MIA and positions of the MIA maps in the MIAs are defined by an anchor descriptor. The data mentioned above may be recorded in a single MIB or over a plurality of MIBs. Where the data are recorded over a plurality of MIBs, in what order the MIBs are to be linked is recorded in a Map Entries field in the MIA map. When the data come to an end intermediately of an MIB, #00 is set to those bytes beginning with the byte next to the end of the data and ending with the last byte of the MIB.

Subsequently, a partition is described. A data storage area defined by Partition Information in the Volume Structure Descriptor is called partition. One physical volume can be divided into a plurality of partitions. A number for specifying a partition in the physical volume is called partition number. The partition number is an integer which monotonously increases one by one beginning with 0. Physical sectors in a same partition have an equal physical sector size.

A partition is defined as a table of partition information in the Volume Structure Descriptor. The partition information defines the partition with the physical sector number of a physical sector at the top of the partition and the number of physical sectors which belong to the partition. At least one or more partitions are defined in the physical volume. The partition numbers are determined in an order in which the partition information is recorded in the Volume Structure Descriptor. The partition number of the partition defined by the first piece of partition information is 0, and that of the second partition is 1. In this manner, the partition number increases one by one, and that of the nth partition is n–1.

Subsequently, the Logical Volume is described. The Logical Volume represents a data storage area defined as an aggregate of partitions in the logical volume information of the Volume Structure Descriptor. The area of the Logical Volume is formed from partition areas linked in an order of description of the Partition Map of the logical volume information. The Partition Map designates partitions belonging to the logical volume with sets of the Volume Identifier which uniquely defines the physical volume and partition numbers of the physical volume. The Logical Volume may be composed of partitions which belong to different physical volumes, or a single partition may belong to a plurality of Logical Volumes.

The logical volume is handled as a single area irrespective of a breakpoint between partitions or physical sectors, and contents of it are read and written in units of a logical sector. When the magnitude of the logical volume is not a multiple of the logical sector size, a fragmental area which appears in the last physical sector is reserved for future extension and is not used. The Volume Structure Descriptor describes a definition of information regarding the partitions included in the physical volume, a definition of the logical volumes and so forth. In order to define a logical volume which extends over a plurality of physical volumes, the logical volume information is described in the Volume Structure Descriptor of that physical volume in which the partition of the partition number 0 is defined without fail.

It is to be noted that, in order to secure the reliability, the physical volume information may be described in the Volume Structure Descriptor of the physical volume to which some other partition other than the partition of the partition number 0 belongs. The Volume Structure Descriptor is recorded in the MIAs.

Subsequently, Defect management is described. Defect management by slipping and linear replacement can be performed for each partition. Whether or not Defect management should be performed for each partition is designated with the partition information of the Volume Structure Descriptor. A substitute data area to be used for slipping and linear replacement is called spare area. In partitions which belong to the same logical volume as that of a partition for which defect management is to be performed, one or more spare areas are assured without fail. Further, when linear replacement is to be performed, the last part of the partition area is used as a spare area.

When slipping is performed, a top portion of the spare area assured at the last part of the partition area is used as a spare area. On the other hand, where linear replacement is to be performed, for the substitute data area, a spare area other than that spare area in a partition which includes a defect sector may be used only if it belongs to the same logical volume and belongs to the same physical volume.

Information regarding slipping and linear replacement is recorded in the Defect List Information of the Volume Structure Descriptor. Information regarding slipping is recorded in the Primary Defect List while information regarding linear replacement is recorded in the Secondary Defect List.

The Media Information Descriptor, which is an area into which information regarding media is to be recorded, is used to record information regarding zones. The Drive Information Descriptor is an area into which information regarding a drive (apparatus to be used for recording and reproduction of data) is to be recorded. Where a fixed drive is used, various pieces of information are recorded in the Drive Information Descriptor.

The Extended Data Descriptor is used to record extension information which cannot be fully recorded in the physical volume information, partition information and logical volume information.

Now, the volume data structure is described. The Anchor Descriptor has a magnitude smaller than the physical sector size and is recorded in a format indicated in Table 4 below.

TABLE 4

Anchor Descriptor

| BP | Length | Name | Contents |
|---|---|---|---|
| 0 | 8 | Signature | Signature |
| 8 | 4 | Start Physical Sector Number of Main MIA | Uint32 |
| 12 | 4 | Number of Physical Sectors in Main MIA | Uint32 |
| 16 | 4 | Start Physical Sector Number of Reserve MIA | Uint32 |
| 20 | 4 | MIA | Uint32 |
| 24 | 2 | Number of Physical Sectors in Reserve MIA | Uint16 |
| 26 | 2 | Number of MIBs for MIA Map in Main MIA ($=x_1$) | Uint16 |
| 28 | $2x_1$ | Number of MIBs for MIA Map in Reserve MIA ($=x_2$) | Uint16 |
| $28+2x_1$ | $2x_2$ | MIB Number of MIA Map for Main MIA in Main MIA | Uint16 |
| $28+2x_1+2x_2$ | $2x_1$ | MIB Number of MIA Map for Reserve MIA in Main MIA | Uint16 |
| $28+4x_1+2x_2$ | $2x_2$ | MIB Number of MIA Map for Main MIA in Reserve MIA  MIB Number of MIA Map for Reserve MIA in Reserve MIA | Uint16 |

The data type field of the Signature (BP 0) has 16 set therein. The Start Physical Sector Number of Main MIA (BP 8) designates the physical sector number of the physical sector at the top of the main MIA. The Number of Physical Sectors in Main MIA (BP 12) designates the number of physical sectors of the main MIA. The Start Physical Sector Number of Reserve MIA (BP 16) designates the physical sector number of the physical sector at the top of the reserve MIA. The Number of Physical Sectors in Reserve MIA (BP 20) designates the number of physical sectors of the reserve MIA. The Number of MIBs for MIA Map in Main MIA (BP 24) designates the magnitude (number of MIBs) of the MIA map. The MIA numbers of MIBs for Main Map in Reserve MIA (BP 26) designates the magnitude (number of MIBs) of the reserve MIA. The MIB Numbers of MIA Map for Main MIA in Main MIA (BP 28) designates MIBs in the main MIA in which the MIA map for the main MIA is recorded. The MIB numbers of the MIBs which form the MIA map are set in order.

The MIB numbers of MIA Map for Reserve MIA in Main MIA (BP $28+2x_1$) designates the MIBs in the main MIA in which the MIA map for the reserve MIA is recorded. The MIB numbers of the MIBs which form the MIA map are set in order. The MIB Numbers of MIA Map for Main MIA in Reserve MIA (BP $28+2x_1+2x_2$) designates the MIBs in the reserve MIA in which the MIA map for the main MIA is recorded. The MIB Numbers of the MIBs which form the MIA map are set in order. The MIB Numbers of MIA Map for Reserve MIA in Reserve MIA (BP 28+4$x_1$+2$x_2$) designates the MIBs in the reserve MIA in which the MIA map for the reserve MIA is recorded. The MIB Numbers of the MIBs which form the MIA map are set in order.

The MIA map is used to indicate a situation in use of the MIBs. The MIA map indicates the positions of MIBs which are used for recording of various data, MIBs which cannot be used because of a defect or the like, and MIBs which are not used. The MIA map is recorded in such a form as indicated in Table 5 below.

TABLE 5

MIA Map

| BP | Length | Name | Contents |
|---|---|---|---|
| 0 | 8 | Signature | Signature |
| 8 | 2 | Location of MIA Map | Uint16 |
| 10 | 2 | Location of Volume Structure Descriptor | Uint16 |
| 12 | 2 | Location of MediaInformation Descriptor | Uinit16 |
| 14 | 2 | Location of DriveInformation Descriptor | Uint16 |
| 16 | 2 | Location of Extended Data Descriptor | Uint16 |
| 18 | 2 | Number of Map Entries(=$x_1$) | Uint16 |
| 20 | 2$x_1$ | Map Entries | bytes |

The data type field of the Signature (BP 0) has 2 set therein. The Location of MIA Map (BP 8) designates the MIB number of the top MIB of the MIA map. The Location of Volume Structure Descriptor (BP 10) designates the MIB number of the top MIB of the Volume Structure Descriptor. The Location of Media Information Descriptor (BP 12) designates the MIB number of the top MIB of the Media Information Descriptor. The Location of Drive Information Descriptor (BP 14) designates the MIB number of the top MIB of the Drive Information Descriptor.

The Location of Extended Data Descriptor (BP 16) designates the MIB number of the top MIB of the Extended Data Descriptor. The Number of Map Entries (BP 18) designates the number of entries of the Map Entry beginning with BP 20. This number is equal to the number of MIBs involved in the MIA and is equal to or smaller than #FFF0. The Map Entries (BP 20) designates the situation of use of the MIBs. One Map Entry is composed of Uint16, and the first map entry corresponds to the first MIB, the second map entry to the second MIB, . . . , and the nth map entry to the nth MIB. Table 6 below indicates the values of the map entries.

TABLE 6

MIA Map Entry

| Value | Interpretation |
|---|---|
| #0000-#FFEF | Next MIB Number |
| #FFF0 | Unusable MIB |
| #FFF1 | Unused MIB |
| #FFF2-#FFFE | Reserved |
| #FFFF | Last MIB of the data structure |

FIG. 8 is a view illustrating a structure of the Volume Structure Descriptor. Referring to FIG. 8, the @APS indicates the Align to Physical Sector, and data of the same indicates alignment to a physical sector. Upon such alignment, #00 is placed into an area from a byte next to the location at which data to be recorded immediately precedently is actually recorded to the end of the sector.

The Volume Structure Descriptor Header is recorded in accordance with Table 7 below.

TABLE 7

Volume Structure Descriptor Header

| BP | Length | Name | Contents |
|---|---|---|---|
| 0 | 8 | Signature | Signature |
| 8 | 2 | Descriptor Size | Uint16 |
| 10 | 2 | Reserved | #00 bytes |
| 12 | 4 | Offset to Physical Volume Information (=48) | Uint32 |
| 16 | 4 | Offset to Partition Information(=416) | Uint32 |
| 20 | 4 | Offset to Spare Area Information | Uint32 |
| 24 | 4 | Offset to Logical Volume Information | Uint32 |
| 28 | 4 | Offset to Defect List Information | Uint32 |

In the data type field of the Signature (BP 0), 17 is set. The Descriptor Size (BP 8) designates the magnitude (number of MIBS) of the Volume Structure Descriptor. The Reserved (BP 10) is reserved for future extension and has #00 set to all bytes thereof. The Offset to Physical Volume Information (RPB 12) designates an offset (byte number) of the Physical Volume Information from the top byte of the Volume Structure Descriptor and has 48 set therein. The Offset to Partition Information (RBP 16) designates an offset (byte number) of the Partition Information from the top byte of the Volume Structure Descriptor, and has 416 set therein. The Offset to Spare Area Information (RBP 20) designates an offset (byte number) of the Spare Area Information from the top byte of the Volume Structure Descriptor. The Offset to Logical Volume Information (RBP 24) designates an offset (byte number) of the Logical Volume Information from the top byte of the Volume Structure Descriptor. The Offset to Defect List Information (RBP 28) designates an offset (byte number) of the Defect List Information from the top byte of the Volume Structure Descriptor.

The Physical Volume Information must be recorded in accordance with Table 8 below.

TABLE 8

Physical Volume Information

| RBP | Length | Name | Contents |
|---|---|---|---|
| 0 | 2 | Character Set | Character set |
| 2 | 2 | Physical Volume Name Size | Uint16 |
| 4 | 256 | Physical Volume Name | bytes |
| 260 | 20 | Physical Volume Identifier | bytes |
| 280 | 6 | Creation Time | Times Stamp |
| 286 | 6 | Modification Time | Times Stamp |
| 292 | 2 | Number of Partitions(=Np) | Uint16 |
| 294 | 2 | Number of Spare Areas(=Ns) | Uint16 |
| 296 | 2 | Number of Partitions with Defect Management(=Nadump) | Uint16 |
| 298 | 2 | Number of Logical Volume (=Nv) | Uint16 |
| 300 | 2 | Reserved | #00 bytes |
| 302 | 2 | Extended Data Identifier | Uint16 bytes |
| 304 | 64 | Extended Data | bytes |

The Character Set (RBP 0) designates a character code of the name of a physical volume recorded in the Physical Volume Name field. The Physical Volume Name Size (RBP 2) designates the magnitude (byte number) of the name of the physical volume recorded in the Physical Volume Name field. The Physical Volume Name (RBP 4) designates the name of the Physical Volume. The Physical Volume Identifier (RBP 260) designates a byte train for specifying the Physical Volume uniquely for practical use. The Creation Time (RBP 280) designates a date and time when the Volume Structure of the Physical Volume was defined for the first time. The Modification Time (RBP 286) designates the latest date and time when the Volume Structure of the Physical Volume was modified. The Number of Partitions (RBP 292) designates the number of partitions included in the Physical Volume and is equal to the number of pieces of the partition information.

The Number of Spare Areas (RBP 294) designates the number of spare areas included in the Physical Volume and is equal to the number of pieces of the spare area information. The Number of Partitions with Defect Management (RBP 296) designates the number of those partitions included in the Physical Volume for which defect management is to be performed, and is equal to the number of the Defect List. The Number of Logical Volumes (RBP 298) designates the number of logical volumes to which the partitions included in the Physical Volume belong, and is equal to the number of pieces of the physical volume information. The Reserved (RBP 300) is reserved for future extension and has #00 set to all bytes therein. The Extended Data Identifier (RBP 302) designates an ID for specifying extended data recorded in the extended data area. The Extended Data (RBP 304) is reserved for future extension and has #00 set to all bytes therein.

The Partition Information must be recorded in a form indicated in Table 9 below.

TABLE 9

Partition Information

| RBP | Length | Name | Contents |
|---|---|---|---|
| 0 | 4 | Start Physical Sector Number | Uint32 |
| 4 | 4 | Number of Physical Sectors | Uint16 |
| 8 | 4 | Number of Usable Sectors | Uint16 |
| 12 | 4 | Physical Sector size(=PSS) | Uint16 |
| 16 | 1 | Access Type | Uint8 |
| 17 | 1 | Usage Information | Uint8 |
| 18 | 2 | Reserved | #00 bytes |
| 20 | 4 | Location of Primary Defect List | DescExtent |
| 24 | 4 | Location of secondary Defect List | DescExtent |
| 28 | 2 | Reserved | #00 bytes |
| 30 | 2 | Extended Data Identifier | Uint16 |
| 32 | 64 | Extended Data | #00 bytes |

The Start Physical Sector Number (RBP 0) designates the physical sector number of the top physical sector in an area which forms the partition. The Number of Physical Sectors (RBP 4) designates the number of physical sectors of the area which forms the partition. The Number of Usable Sectors (RBP 8) designates the total number of those physical sectors in the area forming the partition which can be used, and is equal to the number of those physical sectors in an area except spare areas included in the area of the partition from the total area of the partition. The Physical Sector Size (RBP 12) designates the magnitude (number of bytes) of the physical sector of the area which forms the partition. The Access Type (RBP 16) designates a state of a recording characteristic of the partition. Table 10 below indicates contents of the access type.

TABLE 10

Access Type

| Value | Name | Interpretation |
|---|---|---|
| 0 | Read Only | The user may not write any data in this partition |
| 1 | Write Once | The user can write data but once in this partition |
| 2 | Rewritable | The user can write data many times in this partition |
| 3–15 | Reserved | Reserved for futurer use |

The Usage Information (RBP 17) designates a state of use of the partition. Table 11 below indicates contents of the Usage Information.

TABLE 11

Usage information

| Bit | Interpretation |
|---|---|
| 0 | Used(1:used,0:not used) |
| 1 | Defect management:Slipping(1:on,0:off) |
| 2 | Defect management:Linear replacement(1:on,0:off) |
| 3–7 | Reserved |

The Reserved (RBP 18) is reserved for future extension and has #00 set to all bytes therein. The Location of Primary Defect List (RBP 20) stores in the field thereof information regarding the position at which the primary defect list is recorded when defect management by slipping is to be performed for the partition, but sets #00 to all bytes therein when defect management by slipping is not to be performed. The Location of Secondary Defect List (RBP 24) stores in the field thereof information regarding the position at which the secondary defect list is recorded when defect management by linear replacement is to be performed for the partition, but sets #00 to all bytes therein when defect management by linear replacement is not to be performed. The Reserved (RPB 28) is reserved for future extension and has #00 set to all bytes therein. The Extended Data Identifier (RBP 30) designates an ID for specifying extended data recorded in the Extended Data field or the extended data area. The Extended Data (RBP 32) are reserved for future extension and has #00 set to all bytes therein.

The Spare Area Information is recorded in a form indicated in Table 12 below.

TABLE 12

Spare Area Information

| RBP | Length | Name | Contents |
|---|---|---|---|
| 0 | 4 | Start Physical Sector Number | Uint16 |
| 4 | 4 | Number of Physical Sector | Uint16 |
| 8 | 8 | Reserved | #00 bytes |

The Stare Physical Sector Number (RBP 0) designates the physical sector number of the top physical sector of the spare area. The Number of Physical Sector (RBP 4) designates the number of physical sectors which form the spare area. The Reserved (RBP 8) is reserved for future extension and has #00 set to all bytes therein.

The Logical Volume Information Header is recorded in a form indicated in Table 13 below.

TABLE 13

Logical Volume Information Header

| RBP | Length | Name | Contents |
|---|---|---|---|
| 0 | 2 | Character Set | Character Set |
| 2 | 2 | Logical Volume Name Size | Uint16 |
| 4 | 256 | Logical Volume Name | bytes |
| 260 | 2 | Boot Indicator | Uint16 |
| 262 | 2 | File System Indicator | Uint16 |
| 264 | 2 | Logical Sector Size | Uint16 |
| 266 | 2 | Number of Partitions(=Npv) | Uint16 |
| 268 | 4 | Reserved | #00 bytes |
| 272 | 16 | Logical Volume Contents Use | bytes |
| 288 | 14 | Reserved | #00 bytes |
| 302 | 2 | Extended Data Identifier | Uint16 |
| 304 | 64 | Extended Data | #00 bytes |

The Character Set (RBP 0) designates a character code of the name of the logical volume recorded in the Logical Volume Name field. The Logical Volume Name Size (RBP 2) designates the magnitude (byte number) of the name of the logical volume designated in the Logical Volume Name Field. The Boot Indicator (RBP 260) designates information regarding starting from the logical volume. Contents of the Boot Indicator are indicated in Table 14 below. The physical volume must not include two or more logical volumes whose boot indicators are active and whose top partitions are in the physical volume.

TABLE 14

Boot Indicator

| Value | Name | Contents |
|---|---|---|
| 00h | Not Active | Physical volume is not set that computer boots up from this logical volume |
| 80h | Active | Physical volume is set that computer boots up from this logical volume |

The File System Indicator (RBP 262) designates a file system used in the logical volume. Contents of the File System Indicator are indicated in Table 15 below.

TABLE 15

File System Indicator

| Value | Name | Contents |
|---|---|---|
| 00h | Unknown | This logical volume is unknown. |
| 01h | 12bit FAT | This logical volume is formatted with 12bit FAT. |
| 04h | 16bit FAT | This logical volume is formatted with 16bit FAT. |
| 05h | 16bit FAT, Extended | This logical volume is formatted with 16bit FAT, and defined an executed partition. |
| 06h | 16bit FAT, Extended, 64KB/claster | This logical volume is formatted with 16bit FAT, and defined an extended partition, using 64KB/claster. |
| 07h | HPFS | This logical volume is formatted with HPFS. |
| 08h | 32bit FAT | This logical volume is formatted with 32bit FAT. |
| F0h | KIFS | This logical volume is formatted with KIFS. |

The Logical Sector Size (RBP 264) designates the magnitude (byte number) of the logical sector of the logical volume. The Number of Partitions (RBP 266) designates the number of partitions which form the logical volume, and is equal to the number of the partition map. The Reserved (RBP 268) is reserved for future extension and has #00 set to all bytes therein. The Logical Volume Contents Use (RBP 272) is an area which may be used freely by the file system used by the logical volume. The reserved (RBP 288) is reserved for future extension and has #00 set to all bytes therein. The Extended Data Identifier (RBP 302) designates an ID for specifying extended data recorded in the Extended Data area. The Extended Data (RBP 304) is reserved for future extension and has #00 set to all bytes therein.

The Partition Map is recorded in a form indicated in Table 16 below.

TABLE 16

Partition Map

| RBP | Length | Name | Contents |
|---|---|---|---|
| 0 | 20 | Volume Identifier | bytes |
| 20 | 2 | Partition Number | Uint16 |
| 22 | 2 | Reserved | #00 bytes |

The Volume Identifier (RBP 0) designates a physical volume identifier recorded in the Physical Volume Information of the physical volume to which the partition which forms the logical volume belongs. The Partition Number (RBP 20) designates the partition number of the partitions which form the logical volume. The Reserved (RBP 22) is reserved for future extension and has #00 set to all bytes therein.

The Defect List Information Header is recorded in a form indicated in Table 17 below.

TABLE 17

Defect List Information Header

| RBP | Length | Name | Contents |
|---|---|---|---|
| 0 | 2 | Number of MIB Primary Defect List | Uint16 |
| 2 | 2 | Number of MIB for Secondary Defect List | Uint16 |
| 4 | 12 | Reserved | #00 bytes |

The Number of MIB for Primary Defect List (RBP 0) designates the number of MIBs used to record the primary defect list. The Number of MIB for Secondary Defect List (RBP 2) designates the number of MIBs used to record the secondary defect list. The Reserved is reserved for future extension and has #00 set to all bytes therein.

The Primary Defect List/Secondary Defect List is recorded in a form indicated in Table 18 below.

TABLE 18

Primary Defect List/Secondary Defect List

| RBP | Length | Name | Contents |
|---|---|---|---|
| 0 | 8 | Signature | Signature |
| 8 | 2 | Partition Number | Uint16 |
| 10 | 2 | Number of Entries(=Npd) | Uint16 |
| 12 | 4 | Reserved | #00 bytes |
| 16 | 4(8)Npd | Defect List Entry | bytes |

The data type field of the Signature (BP 0) has 18 set therein for the primary defect list, but has 19 set therein for the secondary defect list. The Partition Number (BP 8) designates the partition number of a partition in which the defect list is used. The Number of Entries (BP 10) designates the entry number of the Defect List Entry. The Reserved (RBP 12) is reserved for future extension and has #00 set to all bytes therein. The Defect List Entry (RBP 16) has, for the primary defect list, the primary defect list entry recorded therein, but has, for the secondary defect list, the secondary defect list entry recorded therein. The defect list entries in both cases are recorded in the ascending order of values of the Physical Sector Number of Defect Sector fields of the individual entries.

The structure of the Media Information Descriptor is illustrated in FIG. 9.

Referring to FIG. 9, the Media Information Descriptor Header is recorded in a form indicated in Table 19 below.

TABLE 19

Media information Descriptor Header

| RBP | Length | Name | Contents |
|---|---|---|---|
| 0 | 8 | Signature | Signature |
| 8 | 2 | Descriptor Size | Uint16 |
| 10 | 6 | Reserved | #00 bytes |
| 16 | 2 | Number of discs | Uint16 |
| 18 | 2 | Number of sides per disc | Uint16 |
| 20 | 2 | Number of layers per side | Uint16 |
| 22 | 2 | Number of zones per layer(=Nz) | Uint16 |
| 24 | 8 | Reserved | #00 bytes |
| 32 | 2 | Number of cylinders | Uint16 |
| 34 | 2 | Number of heads(tracks per cylinder) | Uint16 |
| 36 | 2 | Number of sectors per tracks | Uint16 |
| 38 | 10 | Reserved | #00 bytes |

The data type field of the Signature (BP 0) has 20 set therein. The Descriptor Size (BP 8) designates the magnitude (MIB number) of the Media Information Descriptor. The Reserved (BP 10) is reserved for future extension and has #00 set to all bytes therein. The Number of discs (BP 16) designates the number of discs. The Number of sides per disc (BP 18) designates the number of sides per disc. The Number of layers per side (BP 20) designates the number of layers per side. The Number of zones per layer (BP 22) designates the number of zones per layer. The Reserved (BP 24) is reserved for future extension and has #00 set to all bytes therein. The Number of cylinders (BP 32) designates the number of cylinders. The Number of heads (tracks per cylinder) (BP 34) designates the number of heads (number of tracks per cylinder). The Number of sectors per tracks (BP 36) designates the number of sectors per track. The Reserved (BP 38) is reserved for future extension and has #00 set to all bytes therein.

The Zone Information is recorded in a form indicated in Table 20 below.

TABLE 20

Zone Information

| RBP | Length | Name | Contents |
|---|---|---|---|
| 0 | 4 | Start Physical Sector Number | Uint16 |
| 4 | 4 | Number of Physical Sector | Uint16 |
| 8 | 8 | Reserved | #00 bytes |

The Start Physical Sector Number (RBP 0) designates the physical sector number of the top physical sector of the zone. The Number of Physical Sector (RBP 4) designates the number of physical sectors which compose the zone. The Reserved is reserved for future extension and has #00 set to all bytes therein.

The structure of the Drive Information Descriptor is illustrated in FIG. 10.

Referring to FIG. 10, the Drive Information Descriptor Header is recorded in a form indicated in Table 21 below.

TABLE 21

Drive Information Descriptor Header

| BP | Length | Name | Contents |
|---|---|---|---|
| 0 | 8 | Signature | Signature |
| 8 | 2 | Descriptor Size | Uint16 |
| 10 | 1 | Strategy Type | Uint8 |
| 11 | 5 | Reserved | #00 bytes |

The data type field of the Signature (BP 0) has 21 set therein. The Descriptor Size (BP 8) designates the magnitude (MIB number) of the Drive Information Descriptor. The Strategy Type (BP 10) designates a strategy type. The Reserved is reserved for future extension and has #00 set to all bytes therein.

Figures 11, 12:
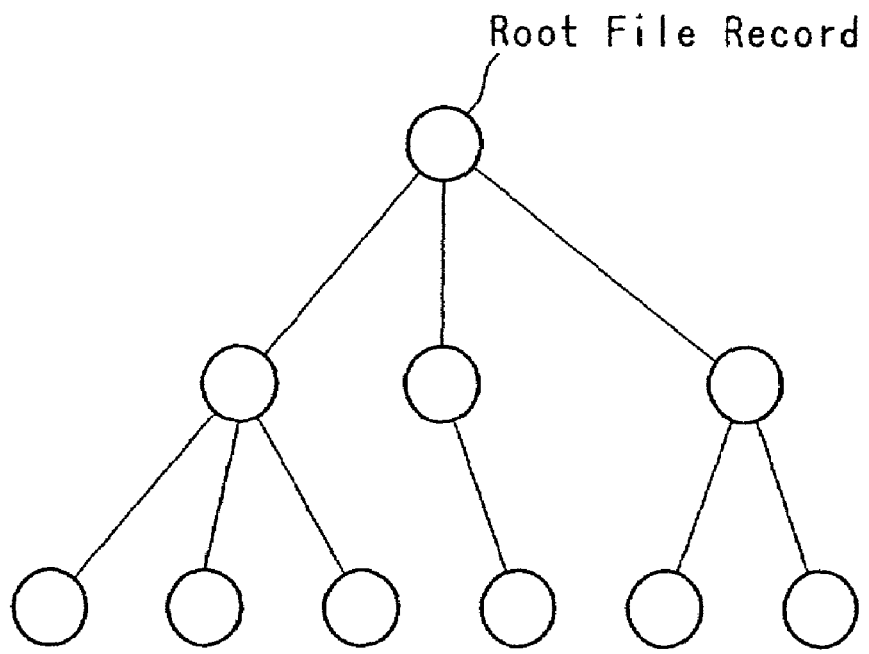
FIG. 11 is a view illustrating an extended data descriptor.
FIG. 12 is a diagrammatic view illustrating a file system.

The structure of the Extended Data Descriptor is illustrated in FIG. 11. Referring to FIG. 11, the @APS represents Align to Physical Sector and indicates that the pertaining data must be aligned with the physical sector. Further, the area beginning with a byte next to the last data and ending with the end of the sector has #00 set therein.

The Extended Data Descriptor Header is recorded in a form indicated in Table 22 below.

TABLE 22

Extended Descriptor Header

| BP | Length | Name | Contents |
|---|---|---|---|
| 0 | 8 | Signature | Signature |
| 8 | 2 | Descriptor Size | Uint16 |
| 10 | 6 | Reserved | #00 bytes |
| 16 | 2 | Location of Extended Data for Physical Volume | Desc Extent |
| 20 | 4Np | Location of Extended Data for Partitions | Desc Extent |
| 20+4Np | 4Nv | Location of Extended Data for Logical Volume | Desc Extent |

The data type field of the Signature (BP 0) has 22 set therein. The Descriptor Size (BP 8) designates the magnitude (MIB number) of the Extended Data Descriptor. The Reserved is reserved for future extension and has #00 set to all bytes therein. The Location of Extended Data for Physical Volume (BP 16) designates a location in which extended data regarding the physical volume is recorded. The Location of Extended Data for Partitions (BP 20) designates a location in which extended data regarding the partitions are recorded. The Location of Extended Data for Logical Volume (BP 20+4Np) designates a location in which extended data regarding the logical volumes are recorded.

Subsequently, levels of medium interchange are described. The level 0 of medium interchange has the following limitations. In particular, a logical volume is composed of partitions which belong to the same physical volume. Where a plurality of partitions are defined in the same physical volume, the areas of the partitions must not overlap with each other. All of physical sectors of the partitions which compose the logical volume have an equal physical sector size. The logical sector size is a multiple of the physical sector size, or alternatively, the physical sector size is a multiple of the logical sector size. The magnitude of the partitions is a multiple of a value of a larger one of the logical sector size and the physical sector size. A partition for which defect management is to be performed assures one or more spare areas therein without fail. Defect management by linear replacement uses the spare area or areas assured in the partition as a substitute data area.

The level 1 of medium interchange has no limitation.

Subsequently, an Example of the volume structure is described. Table 23 below illustrates a table of an example of the volume structure of a hybrid disc of FAT, ISO9660 (with Joliet), ISO/IEC13346, KIFS for a VDR. The mark ◆ represents position fixed information which cannot be rearranged.

TABLE 23

Example of volume structure (FAT, 9660, 13346, KIFS Hybrid)

| PSN(hax) | Descriptor | Contents |
|---|---|---|
| 0 | [FAT]Partition Table | ◆[FAT] Partition Table |
| — | — | — |
| c | [KIFS]Anchor Descriptor | ◆[KIFS] Anchor |
| — | — | — |
| 10 | [9660]Primary Volume Descriptor | ◆[9660]/ 13346/KIFS] Volume recognition Sequence |
| 11 | [9660]Primary Volume Descriptor(Reserve) | |
| 12 | [9660]Supplementary Volume Descriptor(for Joliet) | |
| 13 | [9660]Volume Descriptor Set Terminator | |
| 14 | [13346 ]Beginning Extended Area Descriptor | |
| 15 | [13346 ]NSR Descriptor | |
| 16 | [13346]Terminating Extended Area Descriptor | |
| 17 | [13346]Beginning Extended Area Descriptor | |
| 18 | [KIFS]KIFS Descriptor | |
| 19 | [13346]Terminating Extended Area Descriptor | |
| — | — | — |
| 30 | [13346]Primary Volume Descriptor | [13346] Main Volume Descriptor Sequence Extent |
| 31 | [13346]Implementation Use Volume Descriptor | |
| 32 | [13346]Partition Descriptor | |
| 33 | [13346]Logical Volume Descriptor | |
| 34 | [13346]Unallocated Space Descriptor | |
| 35 | [13346]Terminating Descriptor | |
| — | — | — |
| 40 | [13346]Primary Volume Descriptor | [13346] Reserve Volume Descriptor Sequence Extent |
| 41 | [13346]Implementation Use Volume Descriptor | |
| 42 | [13346]Partition Descriptor | |
| 43 | [13346]Logical Volume Descriptor | |
| 44 | [13346]Unallocated Space Descriptor | |
| — | — | — |
| 80 | [KIFS]MIA Map for Main MIA | [KIFS] Main MIA |
| 81 | [KIFS]MIA Map for Reserved MIA | |
| 82 | [KIFS]Volume Structure Descriptor | |
| 83 | [KIFS] Primary Defect List | |
| 84 | [KIFS] Secondary Defect List | |
| 85 | [KIFS]Media Information Descriptor | |
| 86 | [KIFS]Drive Information Descriptor | |
| 87 | [KIFS]Extended Data Descriptor | |
| 88 | [KIFS] Extended Data | |
| — | — | — |
| C0 | [KIFS]MIA Map for Reserve MIA | [KIFS] Reserve MIA |
| C1 | [KIFS]MIA Map for Main MIA | |
| C2 | [KIFS]Volume Structure Descriptor | |
| C3 | [KIFS] Primary Defect List | |
| C4 | [KIFS] Secondary Defect List | |
| C5 | [KIFS]Defect Sector | |
| C6 | [KIFS]Media Information Descriptor | |
| C7 | [KIFS]Drive Information Descriptor | |
| C8 | [KIFS]Extended Data Descriptor | |
| C9 | [KIFS] Extended Data | |

TABLE 23-continued

Example of volume structure (FAT, 9660, 13346, KIFS Hybrid)

| PSN(hax) | Descriptor | Contents |
|---|---|---|
| — | — | — |
| 100 | [13346]Anchor Volume Descriptor Pointer | ◆[13346] Anchor |
| — | — | — |
| 150 | [KIFS]LOGICAL VOLUME | |
| — | — | — |
| LPSN-150 | — | — |
| — | — | — |
| LPSN-100 | [13346]Anchor Volume Descriptor Pointer | ◆[13346] Anchor |
| — | — | — |
| LPSN-20 | [13346]Anchor Descriptor | ◆[KIFS] Anchor |
| — | — | — |
| LPSN-C Anchor | [13346]Anchor Descriptor | ◆[KIFS] |
| — | — | — |
| LPSN | [13346]Anchor Volume Descriptor Pointer | ◆[13346] Anchor |

Subsequently, an AV File System constructed on the logical volume will be described. The Logical Sector Number is a number applied to identify a logical sector. The Logical Volume is an aggregate composed of logical sectors having an equal size and having successive logical sector numbers of an ascending order beginning with 0.

The Management Information Area (MIA) for file system management is an area including a plurality of successive logical sectors on the logical volume for storing various control information of the AV file system. The Management Information Block (MIB) is a logical sector in the MIA. The Management Information Block Number (MIB Number) has a value equal to a difference of the logical sector number of the management information block and the logical sector number of the top management information block of the MIA.

In the following, the entire AV file system is described. The AV File System Descriptor which will be hereinafter described is recorded in one logical sector and designates the positions and the magnitudes of the main MIA and the reserve MIA on the logical volume and the positions of the MIA maps on the main MIA and the reserve MIA. The position of the AV File System Descriptor is set in the Logical Volume Contents Use (BP 284) field of the Logical Volume Information Header described hereinabove in such a manner as seen from Table 24 below.

TABLE 24

Logical Volume Contents Use field

| RBP | Length | Name | Contents |
|---|---|---|---|
| 0 | 4 | Main AV File System Descriptor Location | Uint32 |
| 4 | 4 | Reserve AV File System Descriptor Location | Uint32 |
| 8 | 8 | Reserved | #00 bytes |

The Main AV File System Descriptor Location (RBP 0) designates the logical sector number of the AV File System Descriptor. The Reserve AV File System Descriptor Location (RBP 4) designates the logical sector number of the AV File System Descriptor which is located at a location different from that designated by the Main AV File System Descriptor Location. If only one AV file system descriptor is present on the logical volume, then #FFFFFFFF is placed in the Reserve AV File System Descriptor Location. The Reserved (RBP 8) is reserved for future extension and has #00 set therein.

Various management information of the AV file system is recorded in the Management Information Area (MIA) for file system management. In order to secure the reliability, two MIAs having management information of the same contents are recorded at different locations on the logical volume and are individually called main MIA and reserve MIA. The positions and the magnitudes of the main MIA and the reserve MIA and the positions of the MIA maps in the MIAs are defined by the AV File System Descriptor. A logical sector in the MIAs is called management information block (MIB), and the offset of the logical sector number of a management information block (MIB) from the top MIB of the MIA is called management information block number (MIB number).

For designation of an MIB, an MIB number is used. Each MIA is a structure of MIBs which cannot be used because of a defect or the like, unused MIBs, and MIBs for storing the MIA Map, File Table, Allocation Extents Table, Allocation Strategy Table, Defect Information Table (Optional) and Extended Attribute Table (Optional) which are data structures. For what object each MIB in each MIA is used is recorded in the MIA map. The various data structures are stored in one MIB or a plurality of MIBs. Where the data structures are recorded in a plurality of MIBs, in what order the MIBs should be linked is recorded in the Map Entry field in the MIA map. If a data structure comes to an end intermediately in an MIB, then #00 is placed in bytes of the MIB beginning with a byte next to the end of the data and ending with the last byte of the MIB.

In the AV file system, files and directories are managed with a file table which will be hereinafter described. The structure of the file table is determined depending upon the File Table Structure Type which is a parameter in the file table header. In the file table structure type 0, the file table is composed of a file table header and one or more file records. A file record is a data area of a fixed length and is composed of a field for identifying the file record, a field for designating a type of the file record, a field for designating dates and times of production and modification, a field for designating a position and a magnitude of data, a field for designating an attribute, a field for designating a parent file record called Parent Link, a field for designating a brother file record called Next Link, a field for designating a child file record called Child Link, and a field for designating an Extended Attribute Record Chain. A number called file record number is applied to a file record, and the parent link, next link or child link is designated using such file record number.

Figures 13, 14, 15, 16:
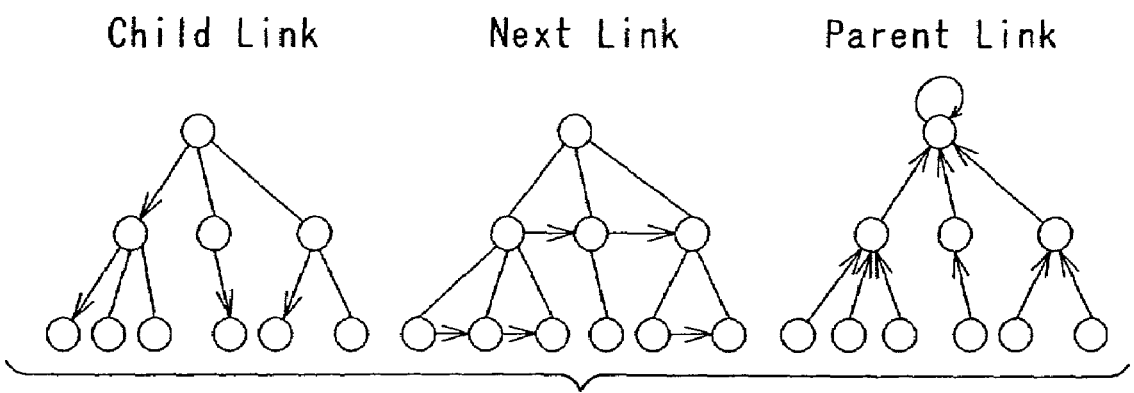
FIG. 13 is a diagrammatic view illustrating a child link, a next link and a parent link.
FIG. 14 is a view illustrating a file table.
FIG. 15 is a view illustrating a file table of the file table structure type 0.
FIG. 16 is a view illustrating an allocation extent table.

In the file table structure type 0, such a tree structure as shown in FIG. 12 wherein the first file record of the file table serves as a root is constructed. Referring to FIG. 12, each circle represents a file record, and the file record of the root is called Root File Record. Each file record which does not have data to be referred to is called directory, and each file which has data is called file. Not only a directory, but also a file can have a child file record. The hierarchical structure just described is implemented by setting Child Links, Next Links and Parent Links as illustrated in FIG. 13.

A list of file records composed of Next Links is called file record chain and must not include two or more records which have a same file type. A sub file is a kind of file and indicates part of data which is referred to by a parent file record as if it were a separate file. A file record wherein the value 10 is placed in the Data Location type of the Attribute field represents a sub file.

In the AV file system, management of data is performed in units of successive areas on a logical volume called Allocation Extent. The Allocation Extent begins with an arbitrary byte offset of a logical sector and either ends with another arbitrary byte offset in the logical sector or includes succeeding zero or more logical sector or sectors and ends with an arbitrary byte offset of another logical sector following the logical sector or sectors. The start point, end point, attribute and so forth of the Allocation Extent "t" are recorded in the Allocation Extent Record in the Allocation Extent Table.

The Allocation Extent Table has recorded therein allocation extent records which correspond to all allocation extents on the logical volume. Each allocation extent record has a field which indicates a next allocation extent record, and a list including a plurality of allocation extent records can be produced using the field. This list is called allocation extent record chain. Normally, file data are handled as a sequenced set of allocation extents corresponding to an allocation extent record chain.

A list composed of those allocation extent records in an allocation extent table which are not used (records whose allocation extent record status is 00) is called free allocation extent record chain and can be traced simply from the allocation extent table. Meanwhile, a list composed of those allocation extent records each of which is determined not to be recommended for re-utilization since it includes a defect in the corresponding allocation extent (those records whose allocation extent record status has the value of 10) is called defective allocation extent record chain. Also this list can be traced simply from the allocation extent table.

At which position an allocation extent is placed in a logical volume is determined by the Allocation Strategy. The allocation strategy table can register a plurality of allocation strategies therein and arrange an allocation extent on a logical volume using an allocation strategy different for each file. The range of an area managed by each allocation strategy or a parameter to be used by the allocation strategy table is recorded in an allocation strategy record in the allocation strategy table. In the file table structure type 0, an allocation strategy is determined for each file record and is recorded in the data location field of the file record. The data location field is referred to upon operation of the allocation extent so that a corresponding allocation strategy is recalled.

Two allocation strategy types of the Allocation Strategy Type 0 and the Allocation Strategy Type 1 are defined. The Allocation Strategy Type 0 is a type suitable to discontinuously handle files of comparatively small sizes such as index data while the Allocation Strategy Type 1 is a type suitable to continuously read or write data of the MPEG or the like.

The Defect Information Table is a table in which logical sector numbers of defect sectors in the logical volume are recorded, and can be used for management of the defective sectors.

The Extended Attribute Table can be used to hold an extension attribute of a file or a directory in the MIAs. The Extended Attribute Table is composed of an extended attribute table header and one or more extended attribute table records. An extended attribute record is a record of a fixed length having a field for a link, and an extended attribute record chain which is a list of a plurality of extended attribute records can be produced.

At the top of the data structure to be used by the AV file system, the Signature is set. The Signature is recorded in such a manner as seen in Table 25 below.

TABLE 25

Signature

| RBP | Length | Name | Contents |
|---|---|---|---|
| 0 | 4 | Identification | bytes="AVFS" |
| 4 | 1 | Version | Uint8=1 |
| 5 | 1 | Data type | Uint8 |
| 6 | 2 | Reserved | #00 bytes |

The Identification (RBP 0) has a character train "AVFS" set therein in accordance with the ISO/IEC 646. The Version (RBP 4) designates a version number and has 1 set therein. The Data type (RBP 5) designates a type of the data structure. Depending upon the type of the data structure, one of values indicated in Table 26 below is placed in the Data type.

TABLE 26

Data type

| Value | Interpretation |
|---|---|
| 0 | Reserved |
| 1 | AV File System Descriptor |
| 2 | MIA Map |
| 3 | File Table |
| 4 | Allocation Extents Table |
| 5 | Allocation Strategy Table |
| 6 | Defect Information Table |
| 7 | Extended Attribute Table |
| 8–255 | Reserved |

The Reserved (RBP 6) is reserved for future extension and has #00 set therein. The Signature is used to identify the data structure upon crush recovery.

The AV File System Descriptor is recorded in such a manner as seen in Table 27 below.

TABLE 27

AV File System Descriptor

| BP | Length | Name | Contents |
|---|---|---|---|
| 0 | 8 | Signature | Signature |
| 8 | 4 | Location of Main MIA | Uint32 |
| 12 | 4 | Location of Reserve MIA | Uint32 |
| 16 | 2 | Length of Main MIA | Uint16 |
| 18 | 2 | Length of Reserve MIA | Uint16 |
| 20 | 4 | Creation Time | Time Stamp |
| 24 | 4 | Modification Time | Time Stamp |
| 28 | 2 | Number of MIA Map Sectors in Main MIA (=$x_1$) | Uint16 |
| 30 | 2 | Number of MIA Map Sectors in Reserve MIA (=$x_2$) | Uint16 |
| 32 | $2x_1$ | MIA Map Sectors in Main MIA | bytes |
| 32+$2x_1$ | $2x_1$ | MIA Map Sectors in Reserve MIA | bytes |

The data type field of the Signature has 1 set therein. The Location of Main MIA (BP 8) designates the sector number of the start logical sector of the main MIA. The Location of Reserve MIA (BP 12) designates the sector number of the start logical sector of the reserve MIA. The Length of Main MIA (BP 16) designates the size of the main MIA in the form of a logical sector number. The Length of Reserve MIA (BP 18) designates the size of the reserve MIA in the form of a logical sector number. The Creation Time (BP 20) stores the date and the time when the AV file system descriptor is produced. The Modification Time (BP 24) designates the date and the time when the AV file system descriptor is updated. The Number of MIA Map Sectors in Main MIA (BP 28) designates the number of MIB numbers described in the Main MIA Map Sectors (BP 32).

The Number of MIA Map Sectors in Reserve MIA (BP 30) designates the number of MIB numbers described in the Reserve MIA Map Sectors (BP 32+$2x_1$). The MIA Map Sectors in Main MIA (BP 32) designates MIBs which form the MIA map in the main MIA, and the MIB numbers of the MIBs which form the MIA map are set in order in the MIA Map Sectors in Main MIA. The MIA Map Sectors in Reserve MIA (BP 32+$2x_1$) designates MIBs which form the MIA map in the reserve MIA, and the MIB numbers of the MIBs which form the MIA map are set in order in the MIA Map Sectors in Reserve MIA.

The MIA Map is used to indicate a situation of use of MIBs in the MIAs. The MIA Map indicates the positions of various data structures in the MIAs, MIBs which cannot be used because of a defect, and unused MIBs. The MIA Map is recorded in such a manner as seen in Table 28 below.

TABLE 28

MIA Map

| BP | Length | Name | Contents |
|---|---|---|---|
| 0 | 8 | Signature | Signature |
| 8 | 2 | Location of MIA Map | Uint16 |
| 10 | 2 | Location of Allocation Strategy Table | Uint16 |
| 12 | 2 | Location of File Table | Uint16 |
| 14 | 2 | Location of Allocation Extents Table | Uint16 |
| 16 | 2 | Location of Defect List Table | Uint16 |
| 18 | 2 | Location of Extended Attribute Descriptor | Uint16 |
| 20 | 2 | Reserved | bytes |
| 22 | 2 | Number of Map Entries(=$x_1$) | Uint16 |
| 24 | $2x_1$ | Map Entries | bytes |

The data type field of the Signature (BP 0) is set to 2. The Location of MIA Map (BP 8) designates the MIB number of the top MIB of the MIA map in the MIA. The Location of Allocation Strategy Table (BP 10) designates the MIB number of the top MIB of the Allocation Strategy Table in the MIA. The Location of File Table (BP 12) designates the MIB number of the top MIB of the file table in the MIA.

The Location of Allocation Extends Table (BP 14) designates the MIB number of the top MIB of the Allocation Extent Table in the MIA. The Location of Defect List Table (BP 16) designates the MIB number of the top MIB of the Defect List Table in the MIA. If the MIA does not have a defect list table therein, then #FFFF is placed in the Location of Defect List Table. The Location of Extended Attribute Descriptor (BP 18) designates the MIB number of the top MIB of the Extended Attribute Descriptor in the MIA. If the MIA does not have an extended attribute descriptor therein, then #FFFF is placed in the Location of Extended Attribute Descriptor. The Reserved (BP 20) is reserved for future extension and has #00 set therein.

The Number of Map Entries (BP 22) designates the entry number of map entries beginning with (BP 24). The entry number is equal to the number of MIBs existing in the MIA and equal to or smaller than #FFF0. The Map Entries (BP 24) designates a situation of use of the MIBs in the MIA. One map entry is composed of Uint16, and the first map entry corresponds to the first MIB of the MIA, the second map entry corresponds to the second MIB, The value of the map entry has such meanings as indicated in Table 29 below.

TABLE 29

Map entry value

| Value | Interpretation |
|---|---|
| #0000-#FFEF | Next MIB Number |
| #FFF0 | Unusable MIB |
| #FFF1 | Unused MIB |
| #FFF2-#FFFE | Reserved |
| #FFFF | Last MIB of the data structure |

If the data structure has a size equal to or smaller than the logical sector size and is stored in one MIB, #FFFF is placed in the map entry corresponding to the MIB. Where the data structure is recorded over a plurality of MIBs, in the map entry corresponding to each of the MIBs other than the last MIB, the MIB number of the next MIB is placed, but in the map entry corresponding to the last MIB, #FFFF is placed. Any MIB whose map entry has the value #FFF1 indicates that the block is unused and can be used where the data structure requires a new MIB. Any MIB whose map entry has the value #FFF0 indicates that the block is not suitable for use (because it is a defective sector or the like).

The File Table is composed of a file table header and file table data as seen from FIG. 14. The structure of the file table data depends on the File Table Structure Type field of the file table header.

The File Table Header is recorded in such a manner as seen from Table 30 below.

TABLE 30

File Table Header

| BP | Length | Name | Contents |
|---|---|---|---|
| 0 | 8 | Signature | Signature |
| 8 | 4 | Length of File Table Data | Uint32 |
| 12 | 2 | File Table Structure Type | Uint16 |
| 14 | 18 | File Table Structure Type dependent information | bytes |

The data type field of the Signature (BP 0) is set to 3. The Length of File Table Data (BP 8) designates the length of the file table data in the form of a byte number. The File Table Structure Type (BP 12) defines the structure of the file table data. The File Table Structure Type dependent Information (BP 14) is set to information determined for each file table structure type.

Where the File Table Structure Type is 0, the file table is composed of a file table header and one or more file records as shown in FIG. 15. The file records have consecutive numbers of an ascending order beginning with 0, and such numbers are called file record numbers. A list of the file records is produced by setting the file record number of a next record in the Next Link field, and is called file record chain. All of those file records in the file table which are not used form a file record chain called free file record chain.

Where the file table structure type is 0, the File Table Header must be recorded in such a manner as seen in Table 31 below.

TABLE 31

File Table Header

| BP | Length | Name | Contents |
|---|---|---|---|
| 0 | 8 | Signature | Signature |
| 8 | 4 | Length of File Table Data | Uint32 |
| 12 | 2 | File Table Structure Type | Uint16(=0) |
| 14 | 2 | Number of File Records | Uint16 |
| 16 | 2 | First Free File Record | Uint16 |
| 18 | 14 | Reserved | #00 bytes |

The data type field of the Signature (BP 0) has 3 set therein. The Length of File Table Data (BP 8) is set to a number obtained by multiplying a length of the file record by the Number of File Records (BP 14). The File Table Structure Type (BP 12) has 0 set therein. The Number of File Records (BP 14) designates the number of file records which compose the file table. The file record number has a value equal to or higher than 1 but equal to or lower than #FFF0. The First Free File Records (BP 14) designates the first element of the free file record chain and has #FFFF set therein where the file table does not include any free file record. The Reserved (BP 18) is reserved for future extension and has #00 set therein.

The File Record must be recorded in such a manner as indicated in Table 32 below.

TABLE 32

File Record of File Structure Type 0

| RBP | Length | Name | Contents |
|---|---|---|---|
| 0 | 2 | File ID | Uint16 |
| 2 | 2 | File Type | Uint16 |
| 4 | 4 | Attribute | Uint32 |
| 8 | 4 | Creation Time | Time Stamp |
| 12 | 4 | Modification Time | Time Stamp |
| 16 | 8 | Data Length | Uint64 |
| 24 | 8 | Data Location | bytes |
| 32 | 2 | Child Link | Uint16 |
| 34 | 2 | Next Link | Uint16 |
| 36 | 2 | Parent Link | Uint16 |
| 38 | 2 | Extended Attribute Record Number | Uint16 |

The File ID (RBP 0) designates a number for identifying a file record having a same file type in the file record chain. The File Type (RBP 2) designates a number for indicating the type of the file record. The Attribute (RBP 4) designates the attribute of the file record or data to be referred to by the file record. The Creation Time (RBP 8) designates the date and the time of production of the file record. The Modification Time (RBP 12) designates the date and the time of modification to the file record or to the data to be referred to by the file record. The Data Length (RBP 16) designates the length of the data to be referred to by the Data Location (RBP 24) in units of a byte and has 0 set therein where there is no data to be referred to. The Data Location (RBP 24) designates the position of the data to be referred to by the file record. The interpretation of the field varies depending upon contents of the Data Location Type (Bit 1–2) of the Attribute (RBP 4). The Child Link (RBP 32) designates the file record number of the child file record, and where no such file record is present, #FFFF is placed in the Child Link. The Next Link (RBP 34) designates the file record number of a next file record which composes the file record chain, and where the file record is the last element of the file record chain, #FFFF is placed in the Next Link.

The Parent Link (RBP 36) designates the file record number of the parent file record, and where the file record is the root file record, the file record number of the file record itself, that is, 0, is placed in the Parent Link. The Extended Attribute Record Number (RBP 38) designates the number of the top extended attribute record of the extended attribute record chain used by the file record, and where the extended attribute record is not referred to, #FFFF is placed in the Extended Attribute Record Number.

The Attribute field is recorded in such a manner as illustrated in Table 33 below.

TABLE 33

Attribute of the File Record

| Bit | Interpretation |
| --- | --- |
| 0 | Valid |
| 1–2 | Data Location Type |
| 3 | Protected |
| 4 | Sorted |
| 5–31 | Reserved |

The Valid (Bit 0) represents whether or not the file record is valid, and where it is 0, this represents that the file record is not used and the file record is included in the free file record chain. Where the Valid is 1, this represents that the file record is used, and the file record can be reached from the root file record through child links and next links. The Data Location Type (Bits 0–1) designates the format of the Data Location (RBP 24). Where the Data Location Type is 00, this represents that the data location has nothing to refer to (the value 00 is set where the file record is a directory). Where the data location type is 01, the data location is represented in a format indicated in Table 34 below which includes the number of the top allocation extent record of the allocation extent record chain and the allocation strategy number. Where the Data Location Type is 10, this represents that the file record is a sub file, and the data location is represented by Uint64 as an offset of the parent file record from the top of data indicated by the data location. The Data Location Type 11 is reserved for future extension.

TABLE 34

Data Location file of Type 01

| RBP | Length | Name | Contents |
| --- | --- | --- | --- |
| 0 | 2 | Reserved | #00 bytes |
| 2 | 2 | Allocation Strategy Number | Uint16 |
| 4 | 4 | First Allocation Extent Record Number | Uint32 |

The Protected (Bit 3) represents that the file record is protected. The Sorted (Bit 4) represents that the file record chain to which the file record belongs is sorted in an ascending order of the file type and, in the same file type, sorted in an ascending order of the file ID. The Reserved (Bits 5–31) is reserved for future extension.

The Structure of the Allocation Extents Table is composed of an allocation extent table header and an allocation extent record or records as seen from FIG. 16. The allocation extent records are numbered consecutively in an ascending order beginning with 0. The numbers are referred to as allocation extent record numbers. By setting the allocation extent record number of the next record to the next allocation extent record field, a list of the allocation extent records is produced. This list is referred to as allocation extent record chain.

The Allocation Extents Table Header is recorded in such a manner as indicated in Table 35 below.

TABLE 35

Allocation Extents Table Header

| BP | Length | Name | Contents |
| --- | --- | --- | --- |
| 0 | 8 | Signature | Signature |
| 8 | 4 | Number of Allocation Extent Records | Uint32 |
| 12 | 4 | First Free Allocation Extent Record | Uint32 |
| 16 | 4 | First Defective Allocation Extent | Uint32 |
| 20 | 4 | Reserved | #00 bytes |

The data type field of the Signature (BP 0) has 4 set therein. The Number of Allocation Extent Records (BP 8) designates the number of allocation extent records in the allocation extent table. The First Free Allocation Extent Record (BP 12) designates the first element of the free allocation extent record chain.

When the allocation extent table has no free allocation extent record, #FFFFFFFF is placed in this field. The First Defective Allocation Extent Record (BP 16) designates the first element of the defective allocation extent record chain. When the allocation extent table does not include a defective allocation extent record therein, #FFFFFFFF is placed in this field. The Reserved (BP 20) is reserved for future extension and has #00 set therein.

The Allocation Extent Record represents the start position, the end position and the attribute of the allocation extent and the position of the next allocation extent record which forms the allocation extent record chain. The allocation extent record is recorded in such a manner as indicated in Table 36 below.

TABLE 36

Allocation Extent Record

| RBP | Length | Name | Contents |
| --- | --- | --- | --- |
| 0 | 4 | Start Logical Sector Number | Uint32 |
| 4 | 1 | Allocation Strategy Number | Uint8 |
| 5 | 1 | Reserved | Uint8 |
| 6 | 2 | Start Offset | Uint16 |
| 8 | 4 | End Logical Sector Number | Uint32 |
| 12 | 2 | Reserved | Uint16 |
| 14 | 2 | End offset | Uint16 |
| 16 | 4 | Attribute | Uint32 |
| 20 | 4 | Next Allocation Extent Record | Uint32 |
| 24 | 8 | Length of the Allocation Extent | Uint64 |

The Start Logical Sector Number (RBP 0) designates a logical sector which includes the start byte of the allocation extent, and has a logical sector number placed therein. The Allocation Strategy Number (RBP 4) designates in accordance with which allocation strategy the allocation extent record is arranged. The Reserved (RBP 5) is reserved for future extension and has #00 set therein. The Start Offset (RBP 6) designates a byte offset from the top byte of the logical sector including the start byte of the allocation extent to the start byte and has 0 placed herein if the start position is equal to the top byte of the logical sector.

The End Logical Sector Number (RBP 8) designates the logical sector number of the logical sector including the last byte of the allocation extent. The Reserved (RBP 12) is reserved for future extension and has #00 set therein. The End Offset (RBP 14) designates the offset from the top byte of the logical sector including the end byte of the allocation extent to the end byte and has 0 placed therein if the end byte is equal to the top byte of the logical sector. The value indicated by the Attribute (RBP 16) signifies such meaning as indicated in Table 37 below.

TABLE 37

Attribute of the Allocation Extent Record

| Bit | Interpretation |
|---|---|
| 0–1 | Allocation Extent Record Status |
| 1–31 | Reserved |

Where the allocation extent record status (Bits 0–1) is 01, this allocation extent record indicates a valid allocation extent and allows normal readout. Where the bits are 11, this allocation extent record indicates a valid allocation extent, but indicates that there is the possibility that it may not allow normal readout because of presence of a defect sector or the like. Where the bits are 00, this indicates that the allocation extent record is not used at present and can be used to arrange a new allocation extent. Where the bits are 10, this indicates that the allocation extent indicated by the allocation extent record is not referred to at all, but it is not suitable to use it to arrange a new allocation extent because it includes a defect sector. The reserved (Bit 2–31) is reserved for future extension and has 0 set therein.

The Next Allocation Extend Record (RBP 20) designates the number of the next allocation extent record which composes the allocation extent record chain. Where the allocation extent record is the last element of the allocation extent record chain, #FFFFFFFF is placed in the Next Allocation Extent Record. The Length of the Allocation Extent (RBP 24) indicates the length of the allocation extent indicated by the allocation extent record in the form of a byte number. The number of bytes determined by calculation from the Start Logical Sector Number (RBP 0), Start Offset (RBP 6), End Logical Sector Number (RBP 8) and End Offset (RBP 14) is equal to the byte number placed in the field of the Length of the Allocation Extent.

The allocation strategy table designates all allocation strategies used to arrange data in the logical volume by the AV file system. The allocation strategy table is composed of an allocation strategy table header and an allocation strategy record or records as seen in FIG. 17.

Referring to FIG. 17, the Allocation Strategy Table Header is recorded in such a manner as seen in Table 38 below.

TABLE 38

Allocation Strategy Table Header

| BP | Length | Name | Contents |
|---|---|---|---|
| 0 | 8 | Signature | Signature |
| 8 | 2 | Number of Allocation Strategy Record | Uint16 |
| 10 | 6 | Reserved | #00 bytes |

The Signature (BP 0) has 5 set therein. The Number of Allocation Strategy Record (BP 8) designates the number of allocation strategy records in the allocation strategy table. The Reserved (RBP 10) is reserved for future extension and has #00 placed therein.

An allocation strategy record is used to designate an allocation strategy. The allocation strategy record is recorded in such a manner as seen in Table 39 below.

TABLE 39

Allocation Strategy Record

| RBP | Length | Name | Contents |
|---|---|---|---|
| 0 | 2 | Length of Allocation Strategy Record | Uint16 |
| 2 | 2 | Allocation Strategy Type | Uint16 |
| 4 | 1 | Allocation Strategy Number | Uint8 |
| 5 | 3 | Reserved | #00 bytes |
| 8 | $x_1$ | Allocation Strategy Type Dependent Data | bytes |

The Length of Allocation Strategy Record (RBP 0) designates the length of the allocation strategy record in the form of a byte number. The length is a multiple of 8. The Allocation Strategy Type (RBP 2) designates the type of the allocation strategy record. The Allocation Strategy Number (RBP 4) designates what numbered record the allocation strategy record is in the allocation strategy table, and if the allocation strategy record is the first record, then 0 is placed in the Allocation Strategy Number. The Reserved (RBP 5) is reserved for future extension and must have #00 placed therein. The Allocation Strategy Type Dependent Data (RBP 8) has placed therein contents which are determined for each allocation strategy type.

In the allocation strategy type 0, the following conditions are met. First, the allocation extent must be arranged in an area defined by the Start Logical Sector Number (RBP 8) and the End Logical Sector Number (RBP 12) of the allocation strategy record. Second, where part of the logical sector is allocated to a certain allocation extent, any byte of the logical sector does not belong to another allocation extent. Third, the top of the allocation extent and the top of the logical sector coincide with each other. The allocation strategy record of the allocation strategy type 0 is recorded in such a manner as seen in Table 40 below.

TABLE 40

Allocation Strategy Record of Allocation Strategy Type 0

| RBP | Length | Name | Contents |
|---|---|---|---|
| 0 | 2 | Length of Allocation Strategy Record | Uint16(=16) |
| 2 | 2 | Allocation Strategy Type | Uint16(=0) |
| 4 | 1 | Allocation Strategy Number | Uint8 |
| 5 | 3 | Reserved | #00 bytes |
| 8 | 4 | Start Logical Sector Number | Uint3 |
| 12 | 4 | End Logical Sector Number | Uint32 |

The Length of Allocation Strategy Record (RBP 0) has 16 set therein. The Allocation Strategy Type (RBP 2) has 0 set therein. The Allocation Strategy Number (RBP 4) designates what numbered record the allocation strategy record is in the allocation strategy table, and if the allocation strategy record is the first record, then 0 is set in the Allocation Strategy Number. The Reserved (RBP 5) is reserved for future extension and has #00 set therein. The Start Logical Sector Number (RBP 8) designates the number of the top logical sector in which the allocation extent is arranged. The End Logical Sector Number (RBP 12) designates the number of the last logical sector of the area in which the allocation extent is arranged.

The allocation strategy record of the allocation strategy type 1 is recorded in such a manner as seen in Table 41 below.

TABLE 41

Allocation Strategy Record of Allocation Strategy Type 1

| RBP | Length | Name | Contents |
| --- | --- | --- | --- |
| 0 | 2 | Length of Allocation Strategy Record | Uint16 |
| 2 | 2 | Allocation Strategy Type | Uint16(=1) |
| 4 | 1 | Allocation Strategy Number | Uint8 |
| 5 | 3 | Reserved | #00 bytes |
| 8 | 2 | Number of Zones(=$x_1$) | Uint16 |
| 10 | 6 | Reserved | #00 bytes |
| 16 | $16x_1$ | Zone Information Records | |

The Length of Allocation Strategy Record (RBP 0) has the length of the allocation strategy record, that is, $16+16x_1$, set therein. The Allocation Strategy type (RBP 2) has 1 set therein. The Allocation Strategy Number (RBP 4) designates what numbered record the allocation strategy record is in the allocation strategy table, and if the allocation strategy record is the first record, then 0 is set in the Allocation Strategy Number. The Reserved (RBP 5) is reserved for future extension. The Number of Zones (RBP 8) designates the number of zone information records in the allocation strategy record. The Reserved (RBP 10) is reserved for future extension and has #00 set therein. The Zone Information Records (RBP 16) has placed therein a number of zone information records which are designated by the Number of Zones (RBP 8). The Zone Information Records are recorded in such a manner as seen in Table 42.

TABLE 42

Zone Information Record

| RBP | Length | Name | Contents |
| --- | --- | --- | --- |
| 0 | 4 | Start Logical Sector Number | Uint32 |
| 4 | 4 | End Logical Sector Number | Uint32 |
| 8 | 4 | Length of Allocation Unit | Uint32 |
| 12 | 4 | Reserved | #00 bytes |

The Start Logical Sector Number (RBP 0) designates the start logical sector number of the zone. The End Logical Sector Number (RBP 4) designates the last logical sector number of the zone. The Length of Allocation Unit (RBP 8) designates an allocation unit to be arranged into the zone. The Reserved (RBP 12) is reserved for future extension and has #00 placed therein.

The Defect Information Table is used to record logical sector numbers of defect sectors in the logical volume. The Defect Information Table is recorded in such a manner as seen in Table 43 below.

TABLE 43

Defect Information Table

| BP | Length | Name | Contents |
| --- | --- | --- | --- |
| 0 | 8 | Signature | Signature |
| 8 | 4 | Number of Defect Sectors(=$x_1$) | Uint32 |
| 12 | 4 | Reserved | #00 bytes |
| 16 | $4x_1$ | Defect Sector Addresses | bytes |

The data type field of the Signature (BP 0) has 6 set therein. The Number of Detect Sectors (BP 8) designates the number of entries of the defect sector address beginning with (BP 16). The Reserved (BP 12) is reserved for future extension and has #00 set therein. The Defect Sector Addresses (BP 16) designates logical sector numbers of defect sectors detected in the logical volume. One entry is composed of Uint32, and the values of the logical sector numbers recorded in the Defect Sector Addresses are sorted in an ascending order.

The Extended Attribute Table is composed of an extended attribute table header and an extended attribute record or records as seen in FIG. 18. The extended attribute records in the Extended Attribute Table are numbered consecutively in an ascending order beginning with 0, and such number is called extended attribute record number. A list of the extended attribute records is produced by placing the next record into the next extended attribute record field and is called extended attribute record chain. Those extended attribute records which are not used in the extended attribute table make up a list called free extended attribute record chain.

The Extended Attribute Table Header is recorded in such a manner as seen in Table 44 below.

TABLE 44

Extended Attribute Table Header

| BP | Length | Name | Contents |
| --- | --- | --- | --- |
| 0 | 8 | Signature | Signature |
| 8 | 2 | Number of Extended Attribute Record | Uint16 |
| 10 | 2 | First Free Extended Attribute Record | Uint16 |
| 12 | 4 | Reserved | #00 bytes |

The data type field of the Signature (BP 0) has 7 set herein. The Number of Extended Attribute Record (BP 8) designates the number of extended attribute records in the extended attribute table and is equal to or smaller than #FFF0. The First Free Extended Attribute Record (BP 10) designates the first element of the free extended attribute record chain, and where the extended attribute table does not include a free extended attribute record therein, #FFFF is set in the First Free Extended Attribute Record. The Reserved (BP 12) is reserved for future extension and has #00 set therein.

The Extended Attribute Record is recorded in such a manner as seen in Table 45 below.

TABLE 45

Extended Attribute Record

| RBP | Length | Name | Contents |
| --- | --- | --- | --- |
| 0 | 2 | Next Extended Attribute Record | Uint16 |
| 2 | 30 | Extended Attribute Information | bytes |

The Next Extended Attribute Record (RBP 0) designates the number of the next extended attribute record which composes the extended attribute record chain. Where the extended attribute record is the last extended attribute record, #FFFF is set in the Next Extended Attribute Record.

Most of existing file systems are designed under the presumption that defect sector processing of a medium is performed in a layer positioned below the file system (for example, replacement processing in a drive). In those file systems, it cannot be discriminated where a defective sector is, and although data can be accessed at a raw transfer rate of the drive where the file system tries to access a defect-free portion of a medium, where the file system tries to access a portion of the medium for which replacement processing has been performed, data can be accessed only at a transfer rate much lower than the raw transfer rate of the drive.

Such a construction as described above has no problem with conventional computer applications because, although it is demanded to improve the average access time, estimation of individual access times is not demanded. However, in audio and video applications, if data are not supplied by a fixed amount in a fixed time, then sound or an image cannot be recorded or reproduced correctly, and therefore, it is required that a file system can perform estimation of a time required for data accessing.

Therefore, the present file system introduces the presumption that defective sector processing need not be performed in a lower layer and makes it possible to accurately estimate a time required for the file system to access data. Further, in the present file system, a field or a flag for defective sector processing which has not been used in conventional file systems is prepared, and therefore, processing of a defective sector can be performed using the field or flag. Here, an example of performing defective sector processing using the function prepared by the present file system is described.

Generally, a defective sector is detected in one of the following cases. First, an error occurs during writing, and a defective sector is detected. Second, although writing is completed regularly, an error is detected when the written portion is read out immediately after the writing. Third, although writing and reading out immediately after the writing are completed regularly, an error is detected when reading out is performed after lapse of a time.

In the first or second case, an error can be detected and dealt with upon writing by performing reading out immediately after writing and performing an operation of confirming that the data have been written correctly. The operation is called Write and Verify.

In the third case, an error is caused by a fault provided by dust on or damage to the optical disc. For this case, no complete countermeasure is available. However, the possibility of data loss can be reduced significantly by employing multiple writing. The present file system principally employs the two techniques of the write and Verify and the multiple writing to perform processing of a defective sector.

The volume structure is defined by the Volume Structure Descriptor, Media Information Descriptor, Drive Information Descriptor and Extended Data Descriptor. A defective sector for such information is dealt with in the following manner.

The volume structure descriptor, media information descriptor, drive information descriptor and extended data descriptor are managed by each MIA. The MIA can record a non-defective sector with certainty by performing write and verify without fail upon recording. Further , taking a defect, which may occur after recording, into consideration, two MIAs are recorded in an overlapping relationship at different locations, and also two MIA maps for managing a situation of use in the MIAs are recorded in an overlapping relationship at different locations.

Further, in a logical volume which is defined by the volume management system, defect management by slipping or linear replacement can be performed for each of partitions which compose the logical volume.

A defective sector is dealt with in the following manner by the AV file system. In particular, when the AV file system performs writing into the AV file system descriptor, it performs write and verify to confirm that writing has been performed correctly. If the AV file system has failed in the writing, then it writes the AV file system descriptor at a different location and re-writes contents of the Logical Volume Contents Use Field. Further, the AV file system writes two AV file system descriptors at two different locations to assure a high degree of reliability.

When the AV file system performs writing into sectors in the MIAs, it performs Write and Verify to confirm that writing has been performed correctly. If the AV file system has failed in the writing, then it writes #FFF0 into the entry field of one of the MIA maps, and then performs a same sequence of operations for a sector in the other MIA. Further, the AV file system writes the MIAs at two locations of the logical volume to assure a high degree of reliability.

Each defective sector detected during operation by the AV file system is registered into the defect information table so that it may thereafter not be used any more.

It sometimes occurs that, for data recorded in an allocation extent, a Write and Verify operation cannot be performed from a demand for the transfer rate, and only Write operation is performed. In any case, when a defective sector is detected, the AV file system determines the portion as an independent allocation extent and places 10 into the allocation extent record status of the allocation extent record of the same so that the allocation extent may be placed into the defective allocation extent record chain. If a defective sector is detected in an allocation extent upon reading out, then the AV file system places 11 into the allocation extent record chain. When releasing of the allocation extent is performed, the defective sector is checked, and the defective sector portion is registered as an allocation extent, whose allocation extent record status is 10, into the defective allocation extent record chain.

FIG. 19 shows a constriction of a recording and/or reproduction apparatus to which the present invention is applied. The recording and/or reproduction apparatus is generally denoted at 1 and constructed such that, when an optical disc 8 is loaded into it, it either records a video signal and an audio signal as well as PC (Personal Computer) data supplied thereto from the outside onto the optical disc 8 or reads out a signal recorded on the optical disc 8 and outputs the signal to the outside.

A user inputting/outputting section 2 includes a key panel 11 and a liquid crystal display unit (LCD) 12. The key panel 11 generates a signal corresponding to an operation thereof by a user and supplies the signal to a system control unit 5. The LCD 12 displays a state of the recording and/or reproduction apparatus 1, information regarding the optical disc 8 loaded in the recording and/or reproduction apparatus 1 and so forth in response to the signal supplied thereto from the system control unit 5.

An AV inputting/outputting section 3 includes a pair of encoder/decoders 13 and 14 and a multiplexer/demultiplexer 15 which are controlled in response to a signal supplied thereto from the system control unit 5. Further, the AV inputting/outputting section 3 supplies a signal representative of each of the encoder/decoders 13 and 14 and the multiplexer/demultiplexer 15 to the system control unit 5.

The encoder/decoder 13 compresses (encodes), upon recording, a video signal supplied thereto from the outside and outputs video data of a predetermined system corresponding to the video signal to the multiplexer/demultiplexer 15. But upon reproduction, the encoder/decoder 13 decompresses (decodes) video data of the predetermined system supplied thereto from the multiplexer/demultiplexer 15 and outputs the decompressed (decoded) video data. The encoder/decoder 14 compresses (encodes), upon recording, an audio signal supplied thereto from the outside and outputs audio data of a predetermined system corresponding to the audio signal to the multiplexer/demultiplexer 15. But upon reproduction, the encoder/decoder 14 decompresses (decodes) audio data of the predetermined system supplied thereto from the multiplexer/demultiplexer 15 and outputs the decompressed (decoded) audio data to the outside.

The multiplexer/demultiplexer 15 multiplexes, upon recording, video data and audio data of the predetermined systems supplied thereto from the encoder/decoders 13 and 14, respectively, and outputs the multiplexed data to a drive unit 7. On the other hand, upon reproduction, the multiplexer/demultiplexer 15 demultiplexes multiplexed video data and audio data supplied thereto from the drive unit 7 and outputs the video data to the encoder/decoder 13 and outputs the audio data to the encoder/decoder 14.

A PC data inputting/outputting unit 4 includes an interface 16 and controls the interface 16 in response to a signal supplied thereto from the system control unit 5 so that a signal representative of a state of the interface 16 is outputted to the system control unit 5. The interface 16 receives PC data of a predetermined form supplied thereto from an external personal computer (not shown) or the like as an input thereto, converts the PC data into data which can be read by the drive unit 7, and outputs the data to the drive unit 7. Further, the interface 16 outputs data supplied thereto from the drive unit 7 in a predetermined form to the external personal computer or the like.

The system control unit 5 controls the user inputting/outputting section 2, AV inputting/outputting section 3, PC data inputting/outputting unit 4 and file management unit 6 based on states of the user inputting/outputting unit 2, AV inputting/outputting section 3, PC data inputting/outputting unit 4 and file management unit 6.

The file management unit 6 controls the drive unit 7 in response to a signal from the system control unit 5 and supplies a signal corresponding to a state of the drive unit 7 to the system control unit 5.

The drive unit 7 operates a buffer 17, an ECC circuit 18, a modulation/demodulation circuit 19 and a pickup 20 and operates them in response to signals from the file management unit 6 to record a signal onto the optical disc 8 or read out a signal from the optical disc 8.

The buffer 17 temporarily stores data supplied thereto from the AV inputting/outputting section 3 or the PC data inputting/outputting unit 4 and outputs the data to the ECC (Error Correction Code) circuit 18 in such a manner that they may not be interrupted. Further, the buffer 17 temporarily stores data supplied thereto from the ECC circuit 18 and supplies the data to the AV inputting/outputting section 3 or the PC data inputting/outputting unit 4 in such a manner that they may not be interrupted.

The ECC circuit 18 adds error correction codes to data supplied thereto from the buffer 17 and outputs resulting data to the modulation/demodulation circuit 19. Further, the ECC circuit 18 performs error correction of data supplied thereto from the modulation/demodulation circuit 19 based on error correction codes and outputs resulting data to the buffer 17.

The modulation/demodulation circuit 19 modulates data supplied thereto from the ECC circuit 18 into data of a predetermined system and outputs the resulting data to the pickup 20. Further, the modulation/demodulation circuit 19 demodulates data supplied thereto from the pickup 20 in accordance with the predetermined system and outputs the demodulated data to the ECC circuit 18.

The pickup 20 records data onto the optical disc 8 loaded in the recording and/or reproduction apparatus 1 based on data supplied thereto from the modulation/demodulation circuit 19. Further, the pickup 20 reads data recorded on the optical disc 8 and outputs the read data to the modulation/demodulation circuit 19.

Figure 20A:
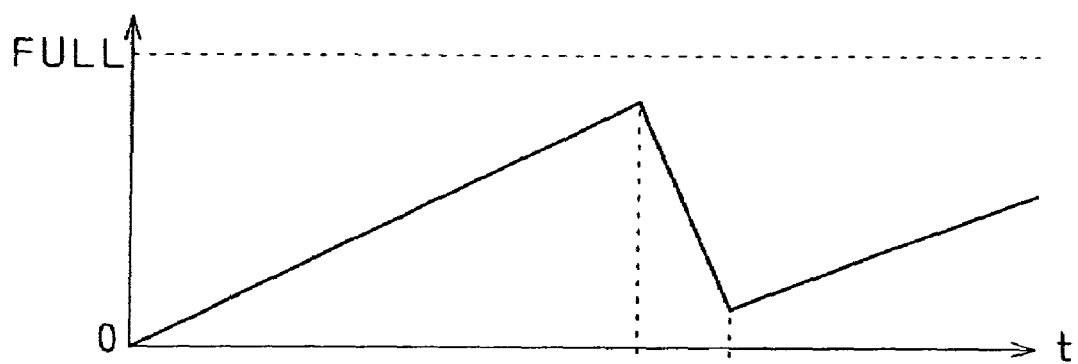
FIGS. 20A and 20B are diagrams illustrating a relationship between the amount of data stored in a buffer of the recording and/or reproduction apparatus of FIG. 19 and the rate of data written into the buffer.
Figure 20B:
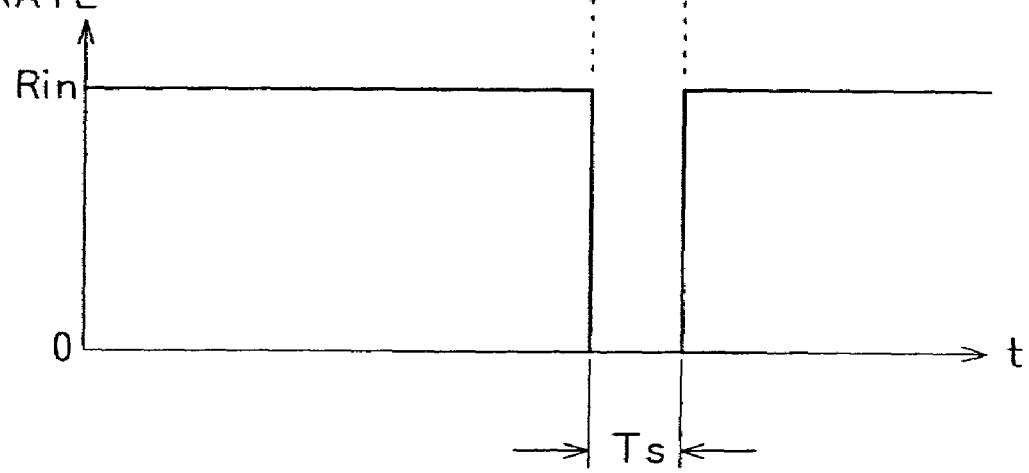

FIGS. 20A and 20B illustrate a relationship between the amount of data recorded in the buffer 17 and the rate at which data are written into the buffer 17 during reproduction. The readout rate Rout of data outputted from the buffer 17 is controlled to a fixed value higher than a predetermined value in such a manner that outputting of signals from the encoder/decoders 13 and 14 may not be interrupted. The data write rate of data supplied to the buffer 17 exhibits a fixed value Rin as seen from FIG. 20B when sectors of the optical disc 8 on which a predetermined file is recorded are read. In the meantime, the data write rate exhibits zero while the pickup 20 moves between tracks of the optical disc 8 or when the pickup 20 waits rotation of the optical disc 8 until a predetermined sector comes to a position at which it can be read by the pickup 20 (for a time Ts of FIG. 20B).

Consequently, when the data write rate to the buffer 17 is 0, since the data recorded in the buffer 17 are only read out at the readout rate Rout, the amount of the data decreases suddenly as seen from FIG. 20A. The amount of data which can be stored into the buffer 17 is determined based on the fixed value Rin and the data readout rate in such a manner that reading out of data may not be interrupted.

Figure 21:
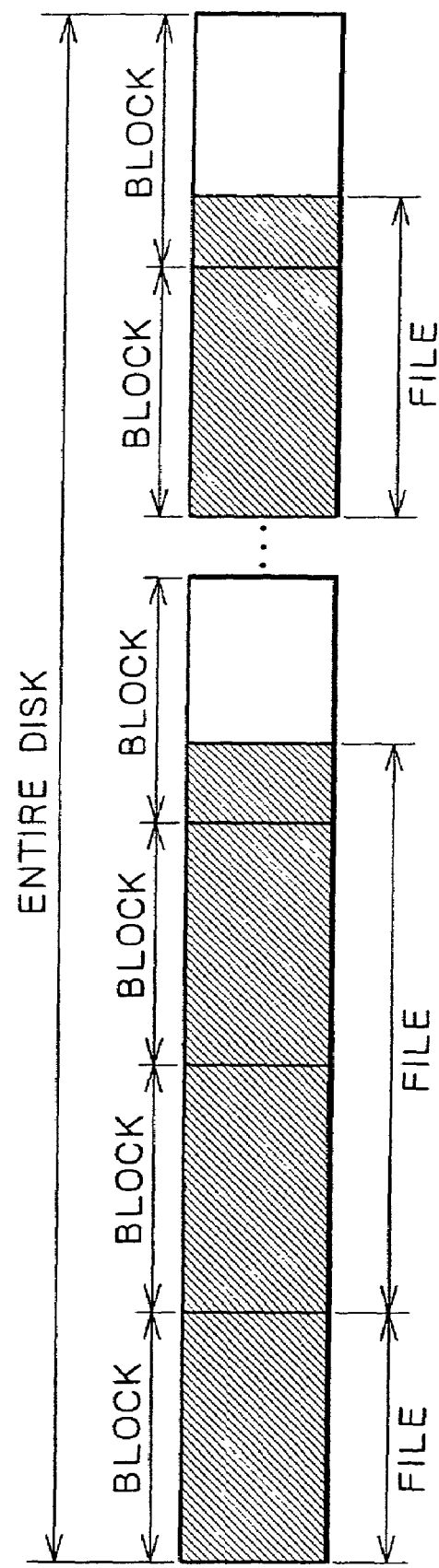
FIG. 21 is a diagrammatic view illustrating a structure of a file recorded on an optical disc used on the recording and/or reproduction apparatus of FIG. 19.

FIG. 21 illustrates a construction of a file recorded on the optical disc 8. Blocks are obtained by dividing the entire disc with an equal size, and the blocks are physically continuous to each other. Further, in each of the blocks, transfer of data is executed at the rate Rin. Data of a file are recorded over one or a plurality of blocks. Accordingly, the blocks are divided into those blocks in which part of a file or an entire file is recorded and those blocks in which data of any file are not recorded. Where the amount of data of a file recorded in a block is smaller than the magnitude of the block, the block immediately prior to the file is recorded fully with data.

FIGS. 22A to 22D illustrate the construction of a file and the amount of data stored in the buffer 17. FIG. 22A illustrates files recorded in blocks. A block 31 is recorded fully with data of the file. Another block 32 next to the block 31 is recorded partially with data of the file. A further block 33 is recorded fully with data of another file. A still further block 34 next to the 33 is recorded partially with data of the file.

FIG. 22B illustrates the write rate into the buffer 17 when the blocks illustrated in FIG. 22A are read out. When the block 31 is read out, since it is physically continuous, the write rate into the buffer 17 is the fixed rate of Rin. Similarly, when the block 32 is read out, when the block 33 is read out, and when the block 34 is read out, the write rate into the buffer 17 is the fixed rate of Rin.

When reading out of the block 32 is performed after reading out of the block 31 is ended, the block 31 and the block 32 are not necessarily be physically continuous to each other, and if they are not continuous to each other, then the pickup 20 waits rotation of the optical disc 8 while it moves between tracks of the optical disc 8 or until a predetermined sector comes to the position at which it can be read by the pickup 20. Therefore, a period Ts1 within which the write rate into the buffer 17 is reduced to 0 is present. Similarly, when reading out of the block 33 is performed after reading out of the block 32, another period Ts2 within which the write rate into the buffer 17 is reduced to zero is present, and when reading out of the block 34 is performed after reading out of the block 33 is completed, a period Ts3 within which the write rate into the buffer 17 is reduced to zero is present.

FIG. 22C illustrates the data readout rate from the buffer 17. The data readout rate normally exhibits the fixed value Rout. FIG. 22D illustrates the amount of data stored in the buffer 17. Similarly as in FIG. 20A, the data amount of the buffer 17 increases at a rate corresponding to the difference between the write rate Rin and the readout rate Rout, and when the data write rate into the buffer 17 exhibits zero, since only reading out from the buffer 17 proceeds, the amount of data recorded in the buffer 17 decreases suddenly. Particularly when the data write rate becomes zero after the block 32 or the block 34 which is recorded only partially with data of a file is read out, the amount of data recorded in the buffer 17 decreases at a high rate, and consequently, in order to prevent possible underflow, the buffer 17 must have a storage capacity higher than a predetermined level.

Figure 23:
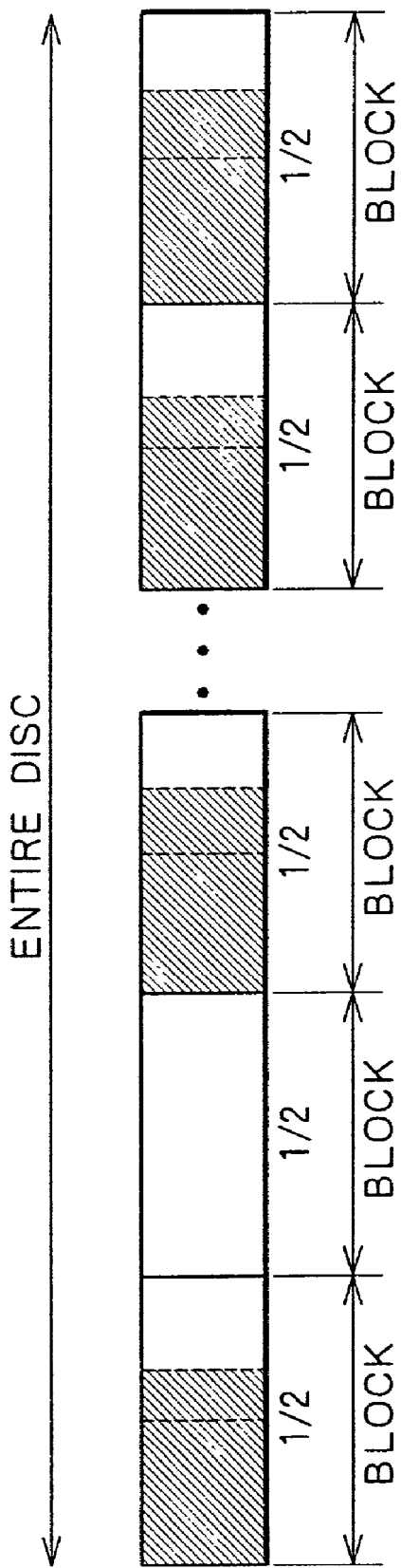
FIG. 23 is a diagrammatic view illustrating another construction of a file recorded on the optical disc used in the recording and/or reproduction apparatus of FIG. 19.

FIG. 23 illustrates another example of a construction of a file recorded on the optical disc 8. In the construction illustrated in FIG. 23, a block recorded partially or entirely with data of a file is recorded with the data of the file over more than one half the block without fail.

Figure 24A:
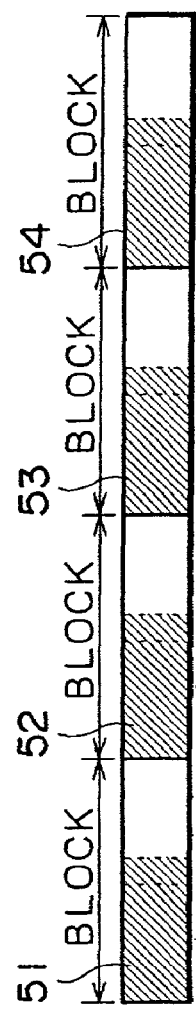
FIGS. 24A, 24B, 24C and 24D are diagrams illustrating the structure of the file illustrated in FIG. 23 and the amount of data stored in the buffer of the recording and/or reproduction apparatus of FIG. 19.

FIGS. 24A to 24D illustrate a variation of the amount of data of the buffer 17 where the file is constructed in such a manner as illustrated in FIG. 23. FIG. 24A illustrates files recorded in blocks. In FIG. 24A, a file is recorded over more than one half of each of blocks 51 to 54.

Figure 24B:
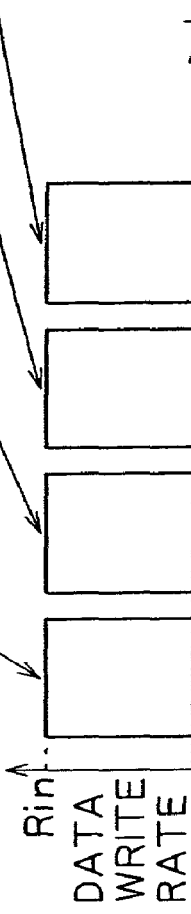

FIG. 24B illustrates the write rate into the buffer 17 when the blocks illustrated in FIG. 24A are read out. When the block 51 is to be read out, the write rate into the buffer 17 is the fixed rate of Rin since the block 51 is physically continuous. Similarly, when the block 52 is read out, when the block 53 is read out and when the block 54 is read out, the write rate into the buffer 17 is the fixed rate of Rin.

When reading out of the block 52 is performed after reading out of the block 51 is ended, if they are physically spaced away from each other, then a period Ts4 within which the write rate into the buffer 17 is reduced to zero is present. Similarly, when reading out of the block 53 is performed after reading out of the block 52 is ended, a period Ts5 within which the write rate into the buffer 17 is reduced to zero is present, and when reading out of the block 54 is performed after reading out of the block 53 is ended, a period Ts6 within which the write rate into the buffer 17 is reduced to zero is present.

Figure 24C:
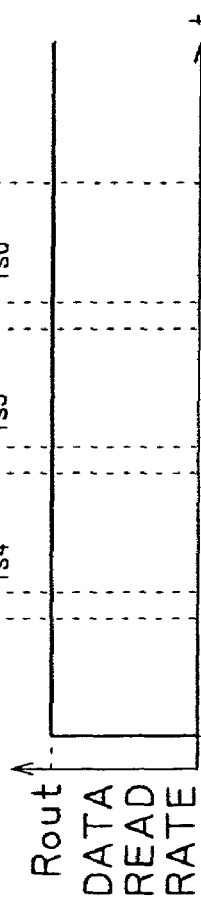
Figure 24D:
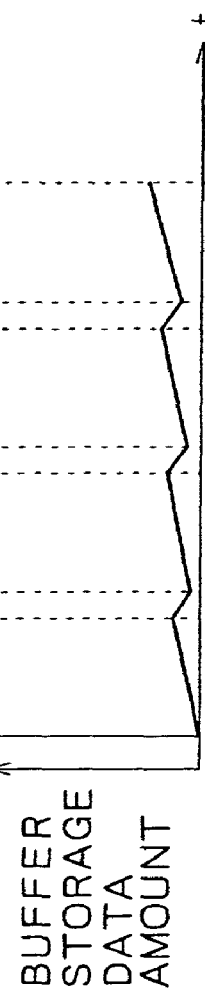

FIG. 24C illustrates the data readout rate from the buffer 17. The data read out rate always has the fixed value Rout. FIG. 24D illustrates a variation of the amount of data stored in the buffer 17. When the data write rate into the buffer 17 is reduced to zero, the amount of data stored in the buffer 17 decreases suddenly. When compared with the stored data amount of the buffer illustrated in FIG. 22D, since each of the blocks 51, 52, 53 and 54 has data recorded over more than the fixed amount (½) thereof, the possibility that the amount of data stored in the buffer 17 may approach zero is lower than that illustrated in FIG. 22D.

FIGS. 25A and 25B illustrate recording processing of a file into blocks by the file management unit 6. Processing in a case wherein data of a file are recorded in blocks 71 to 73 and a file 75 of a data amount smaller than one half a block 74 is recorded into the block 74 newly as seen in FIG. 25A is described. As seen from FIG. 25B, the file stored in the block 73 is divided leaving a front half portion 81 which occupies one half the block 73, and the other rear half 82 is moved to the top of the block 74. The file 75 is recorded following the rear half portion 82 of the block 74.

As described above, any block in which part or the entirety of a file is recorded with the file over one half the block.

Figure 26:
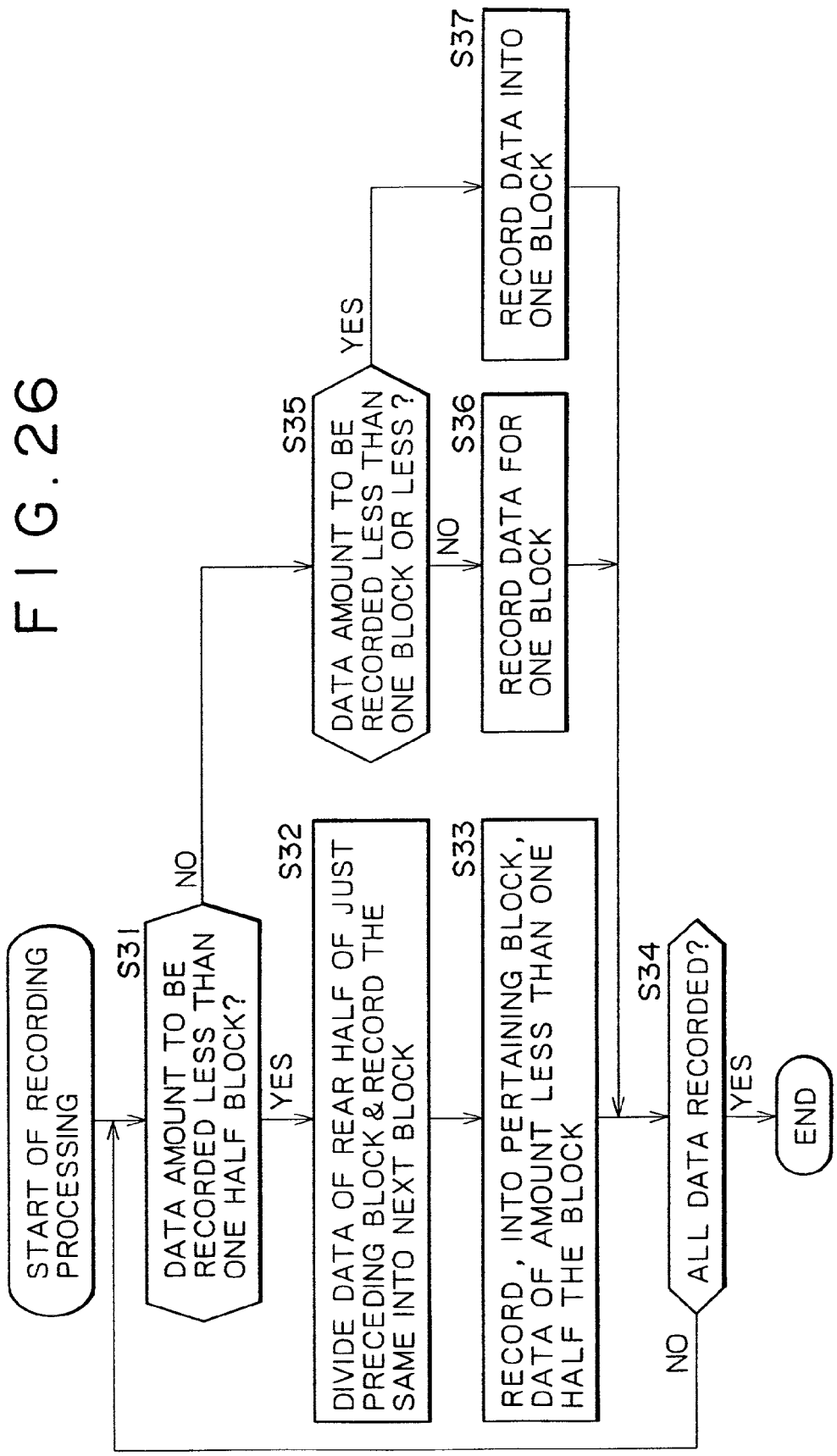
FIG. 26 is a flow chart illustrating a procedure of recording data into blocks.

The processing described above can be summarized in such a manner as illustrated in a flow chart of FIG. 26. Referring to FIG. 26, the file management unit 6 discriminates in step S31 whether or not the amount of data to be recorded into a particular block is smaller than one half a block. If the amount of data to be recorded is smaller than one half a block, then the control advances to step S32, in which the data of the rear half of a block immediately prior to the particular block are divided and recorded into the particular block. Then in step S33, the file management unit 6 records the data of the amount smaller than one half a block continuously into the particular block.

Then, in step S34, the file management unit 6 discriminates whether or not all data have been recorded. Then, if it is discriminated that all data have not been recorded, then the control returns to step S31 to repeat the processing described above.

If it is discriminated in step S31 that the amount of data to be recorded is not smaller than one half a block, then the control advances to step S35, in which the file management unit 6 discriminates whether or not the amount of data to be recorded is smaller than one block. If it is discriminated that the amount of data to be recorded is not smaller than one block, then the control advances to step S36, in which the file management unit 6 records the data for one block, whereafter the control advances to step S34.

If it is discriminated in step S35 that the amount of data to be recorded is smaller than one block, then the control advances to step S37, in which the file management unit 6 records the data into one block, whereafter the control advances to step S34.

If it is discriminated in step S34 that all data have been recorded, then the processing is ended.

Figure 27:
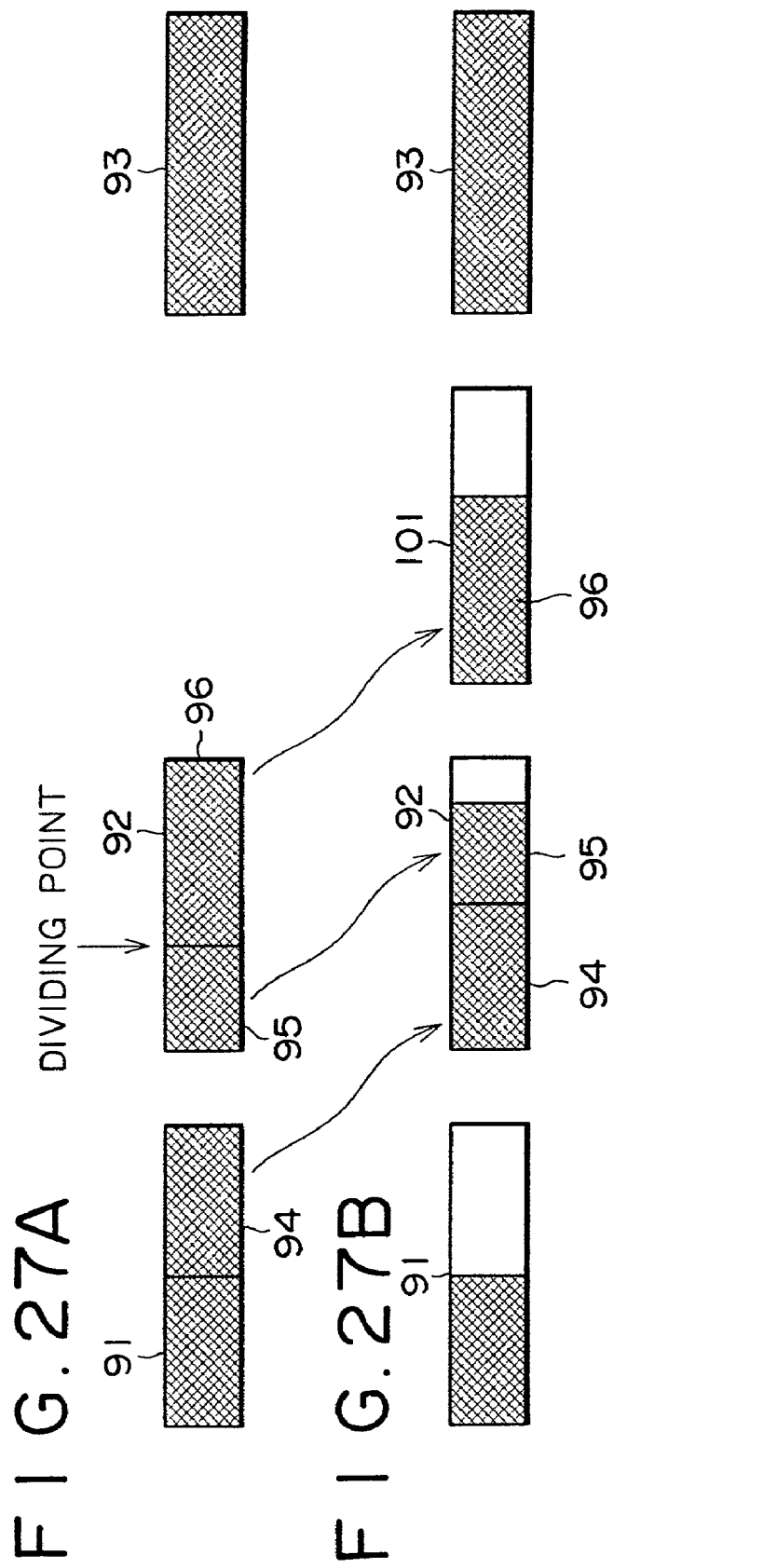
FIGS. 27A and 27B are diagrammatic views illustrating a procedure of dividing a file recorded in a block.

FIGS. 27A and 27B illustrate processing of dividing a recorded into blocks. Processing when one file is recorded in blocks 91 to 93 and this file is divided into a file from the start point of the block 91 to a dividing point of the block 92 (which is positioned forwardly one half the block 92) and another file from the dividing point of the block 92 to the end point of the block 93 as seen in FIG. 27A is described. As seen from FIG. 27B, the data of the block 91 preceding to a portion 95 of the block 92 from the start point to the dividing point are divided into two portions, and the rear half portion 94 of them is moved to the block 92. A front portion 95 of the block 92 is stored following the rear half portion 94 moved to the block 92. On the other hand, the portion 96 of the block 92 from the dividing point to the end point is stored into a new block 101.

Figure 28:
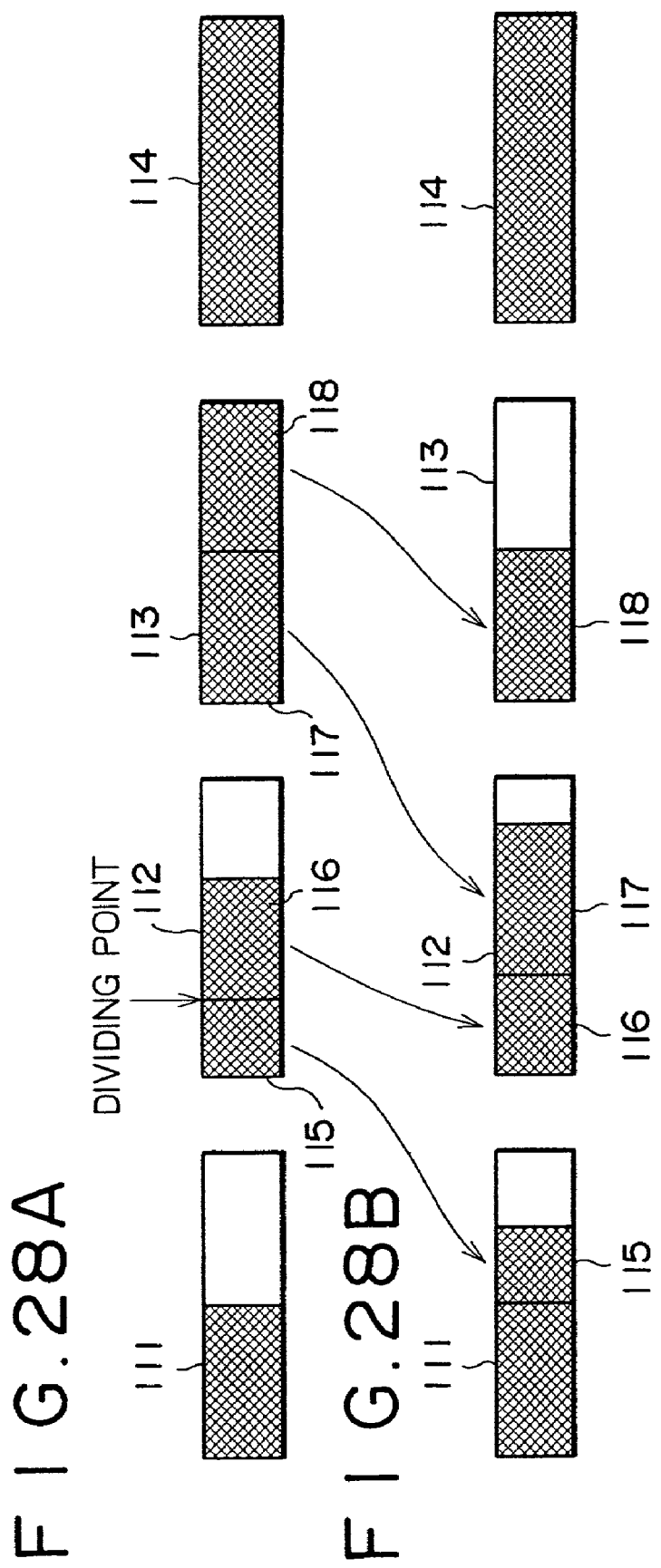
FIGS. 28A and 28B are diagrammatic views illustrating another procedure of dividing a file recorded in a block.

FIGS. 28A and 28B illustrate another example of dividing processing of a file. Processing when a single file recorded in blocks 111 to 114 is divided at a dividing point positioned forwardly of one half position of the block 112 is described.

If the block 111 has an area sufficient to allow recording of a portion 115 of the block 112 from its start point to the dividing point as seen in FIG. 28B, then the block 115 is recorded following the file recorded already in the block 111. A portion 116 of the block 112 from the dividing point to the end of the data is moved to a position beginning with the start point of the block 112. Data of the block 113 recorded in the overall range thereof are divided into two portions, and the front half portion 117 of them is moved to the block 112 and recorded following the portion 116 of the block 112. The other rear half portion 118 of the block 113 is moved to a position beginning with the start point of the block 113.

Figure 29:
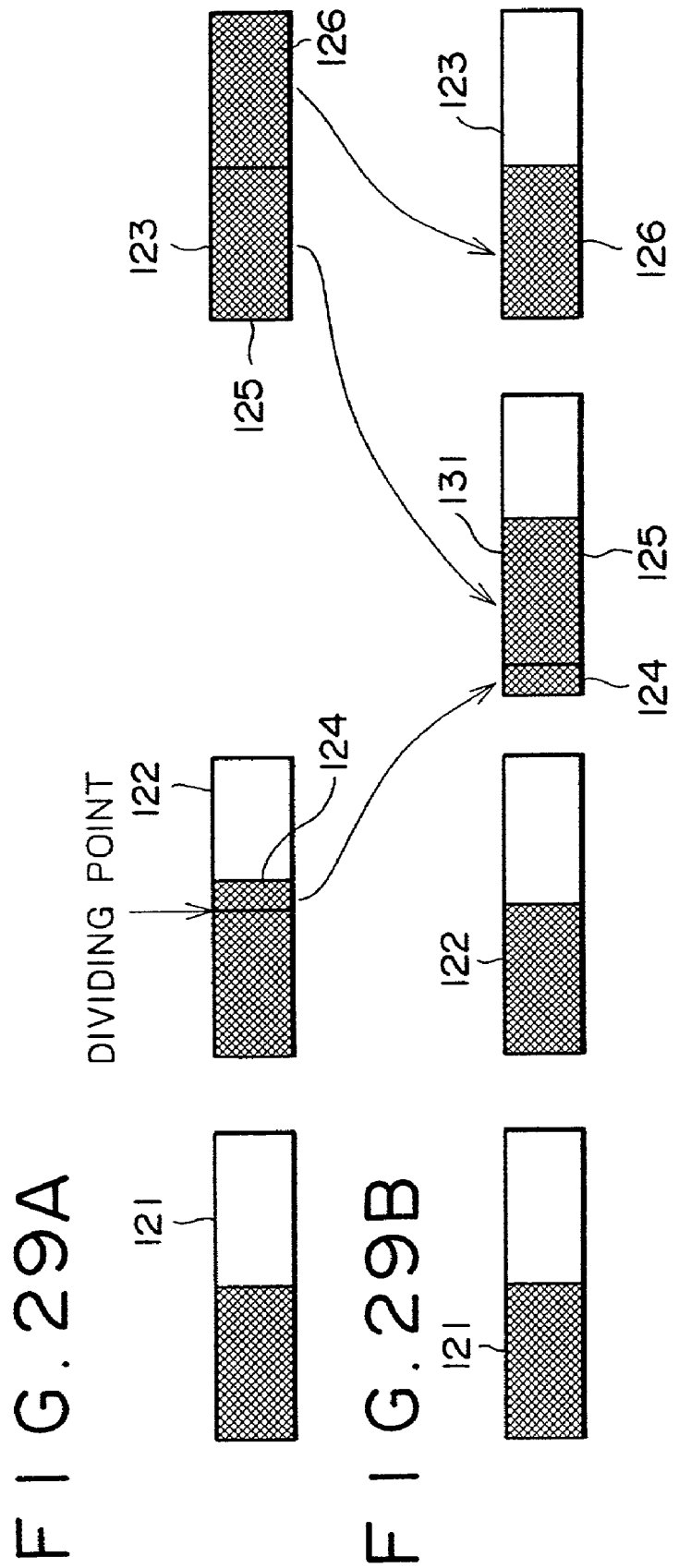
FIGS. 29A and 29B are diagrammatic views illustrating a further procedure of dividing a file recorded in a block.

FIGS. 29A and 29B illustrate a further example of processing of dividing a file recorded in blocks. Processing when a single file recorded in blocks 121 to 123 is divided at a dividing point given as a middle point of the block 122 as seen in FIG. 29A is described. As seen from FIG. 29B, a portion 124 of the block 122 from the dividing point to the end of the data is stored at the top of a new block 131. The file of the block 123 recorded in the overall range thereof is divided into two portions, and the front half portion 125 of them is stored into the block 131 following the portion 124, and the other rear half portion 126 is moved to the top of the block 123.

As described above, even if a file is divided, any block is recorded with the file over more than one half thereof.

Figure 30:
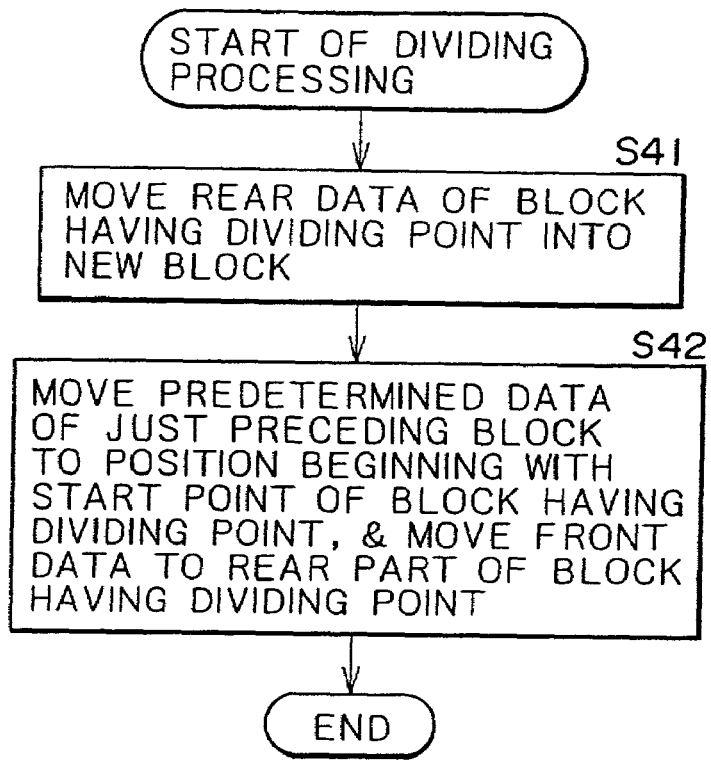
FIGS. 30 to 32 are flow charts illustrating different procedures of dividing a file.

The processing of dividing a file illustrated in FIGS. 27A and 27B wherein the magnitude of data from a start point to a dividing point of a block is smaller than the magnitude of a block and the magnitude of the data rearwardly of the dividing point is equal to or more than one half the magnitude of a block is such as illustrated in a flow chart of FIG. 30. Referring to FIG. 30, first in step S41, the file management unit 6 moves data of that portion of a block having a dividing point which is positioned rearwardly of the dividing point to a new block. In step S42, the file management unit 6 moves predetermined data of another block immediately preceding to the block having the dividing point to a position beginning with the start point of the block having the dividing point, and moves the data of the block having the dividing point which ranges from the start point to the dividing point to the position following the thus moved predetermined data.

Figure 31:
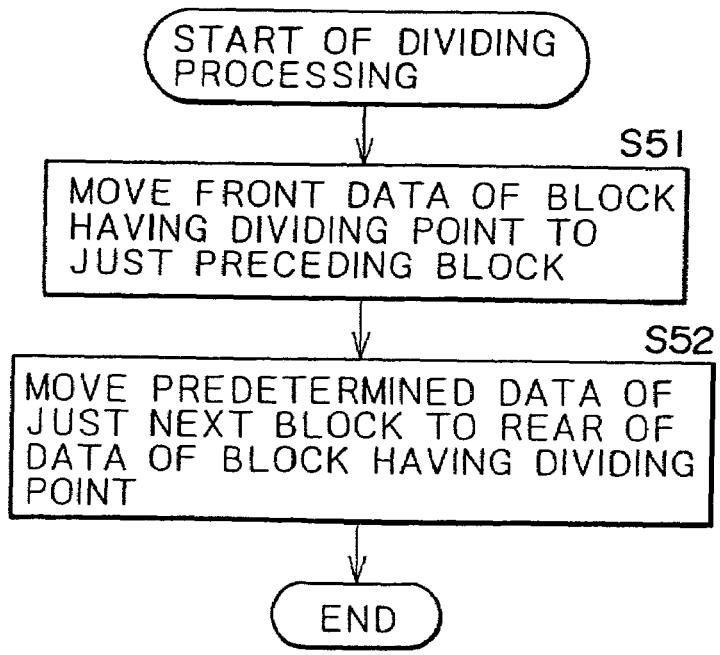

The processing of dividing a file illustrated in FIGS. 28A and 28B wherein the magnitude of a free portion immediately forwardly of a block having a dividing point is larger than the magnitude of data from the start point to the dividing point of the block having the dividing point and the magnitude of data rearwardly of the dividing point is smaller than one half the magnitude of a block is such as illustrated in FIG. 31. Referring to FIG. 31, first in step S51, the file management unit 6 moves the data from the start point to the dividing point of the block having the dividing point to the free portion of the block immediately preceding to the block having the dividing point. In step S52, the file management unit 6 moves predetermined data immediately following the block having the dividing point to the position rearwardly of the data of the block having the dividing point.

Figure 32:
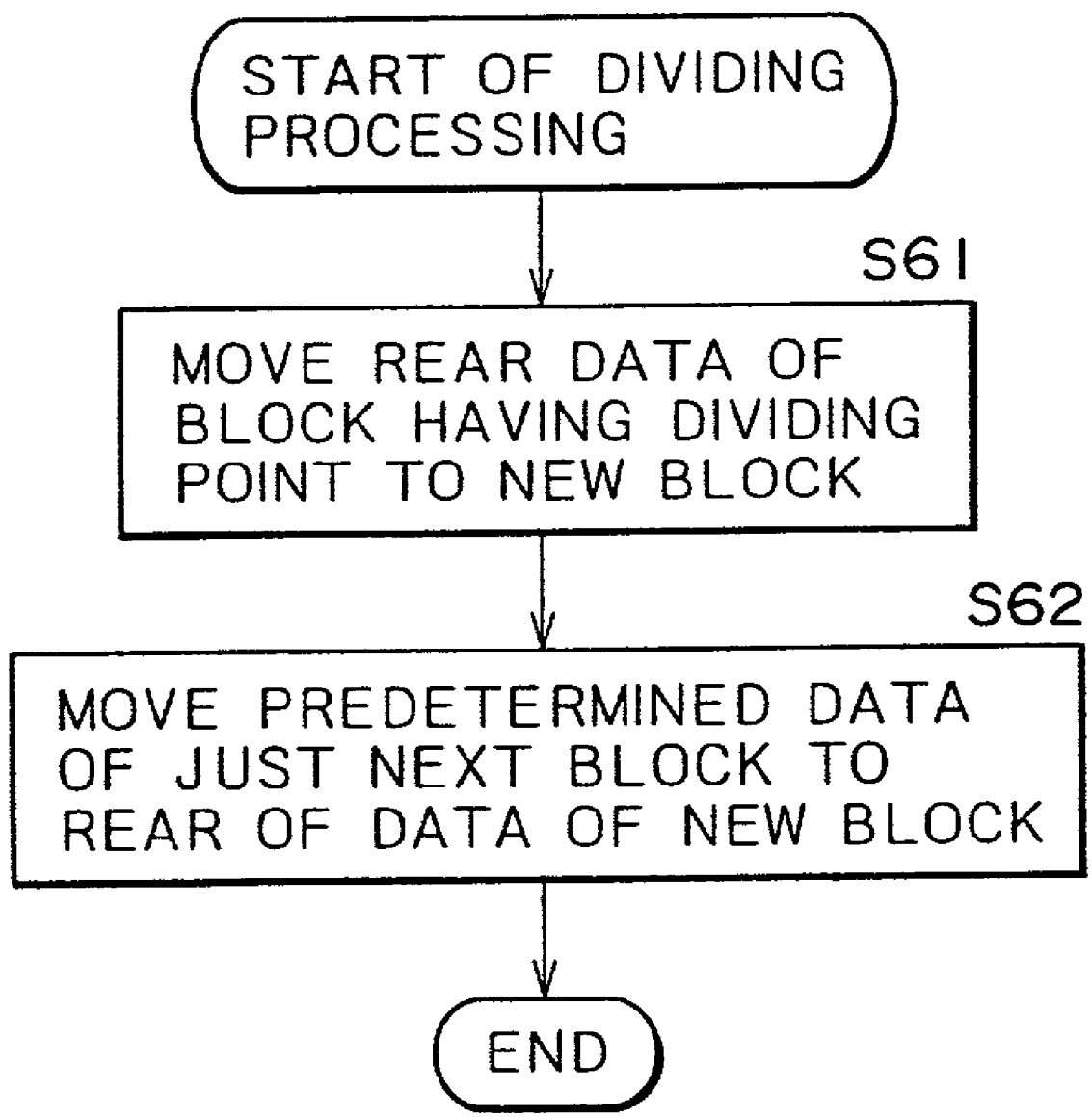

The processing of dividing a file illustrated in FIGS. 29A and 29B wherein the magnitude of data from the start point to a dividing point of a block is equal to or later than one half the magnitude of a block and the magnitude of data rearwardly of the dividing point is smaller than one half the magnitude of a block is such as illustrated in the flow chart of FIG. 32. Referring to FIG. 32, the file management unit 6 moves the data rearwardly of the dividing point to a new block in step S61. In step S62, the file management unit 6 moves predetermined data of another block immediately following the block having the dividing point to the position rearwardly of the data of the new block.

While the processing described above is performed depending upon whether or not the magnitude of data from the start point to the dividing point of a block is equal to or larger than one half the magnitude of a block, it may be performed otherwise depending upon whether or not the magnitude of such data is equal to or larger than (n−1)/n (n=2, 3, 4, 5, . . . ).

Figure 33:
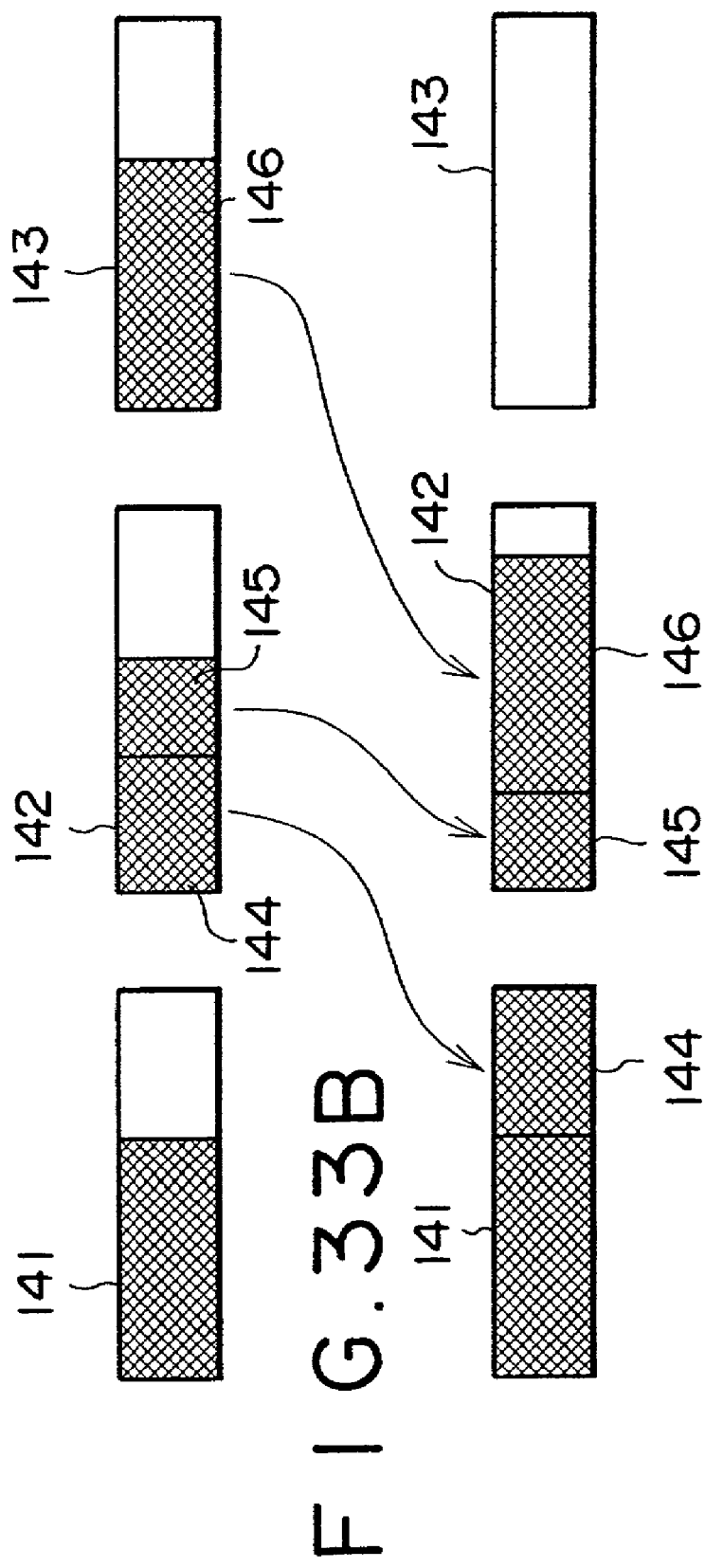
FIGS. 33A and 33B are diagrammatic views illustrating a procedure of compressing free areas of blocks.

FIGS. 33A and 33B illustrate processing of compressing free areas of blocks where the sum of free areas of three successive blocks is equal to or larger than the area of one block. As seen from FIG. 33A, the sum of free areas of blocks 141 to 143 is equal to or larger than the area of one block. Data stored in the block 142 are divided into a portion 144 having a magnitude equal to the magnitude of the free area of the block 141 and the remaining portion 145.

As seen in FIG. 33B, the portion 144 of the block 142 is moved to the free area of the block 141. The portion 145 of the block 142 is moved to the top of the block 142, and data 146 of the block 143 are moved to the block 142 and stored following the portion 145. The block 143 becomes free.

In this manner, the free area of the blocks 141 and 142 can be minimized and the block 143 can be made free.

Figure 34:
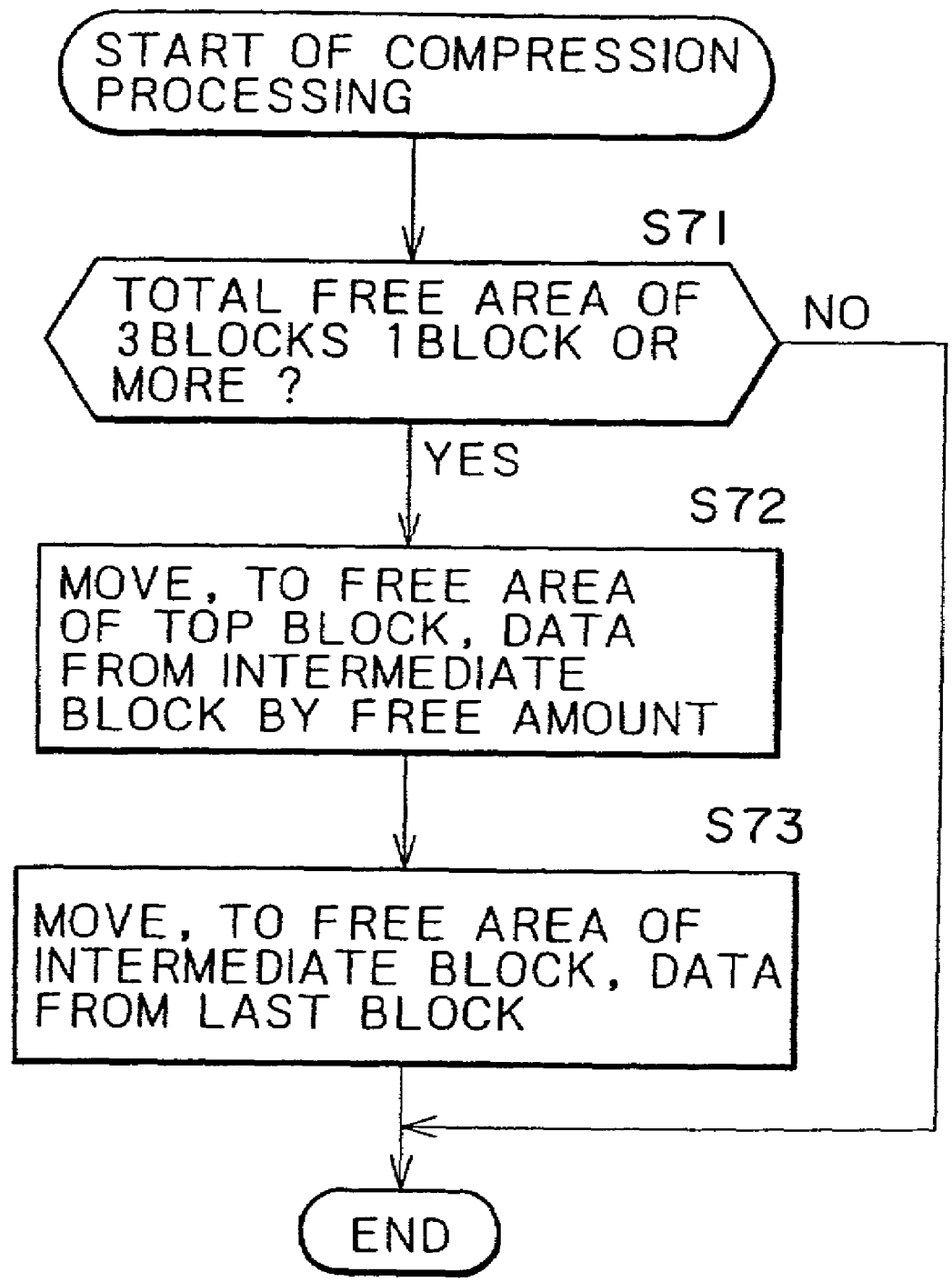
FIG. 34 is a flow chart illustrating a procedure of compressing free areas of blocks.

The processing described above can be summarized as illustrated in a flow chart of FIG. 34. Referring to FIG. 34, the file management unit 6 discriminates in step S71 whether or not the sum of free areas of three blocks is equal to or larger than the area of one block. If it is discriminated that the sum of free areas of the three blocks is equal to or larger than the area of one block, then the control advances to step S72, in which data of an amount equal to the free area of the top block are moved from the intermediate block to the free area of the top block. Then in step S73, the file management unit 6 moves data of the last block into the resulting free area of the intermediate block, thereby ending the processing.

If it is discriminated in step S71 that the sum of the free areas of the three blocks is not equal to or larger than the area of one block, then the processing is ended.

As described above, any block in which part or the entire of a file is recorded is recorded with data over one half or more of the block, and periods in which the write rate is reduced to zero are dispersed. Consequently, even if the capacity of the buffer 17 is small, the output is not interrupted.

It is to be noted that the providing medium to be used to provide to a user a computer program for achieving such processing as described hereinabove may be a recording medium such as a magnetic disc, a CD-ROM or a solid state memory or a communication medium such as a network or a satellite.

What is claimed is:

1. A recording and/or reproduction apparatus for recording and/or reproducing information onto and/or from a disc type recording medium, comprising:

a recording unit operable to record said information in recording units of respective lengths on the recording medium and management information to at least two locations of a logical volume; and a controller operable to generate said management information including identification information indicating one of a plurality of respective types of information, the type of information including at least AV data and non-AV data, the type of information being determinative of the length of recording units used to record the information.

2. A recording and/or reproduction apparatus according to claim 1, wherein the management information recorded by said recording unit includes information at least of a defective sector or sectors and an unused sector or sectors.

3. A method for recording and/or reproducing information onto and/or from a disc type recording medium, comprising the steps of:

recording said information in recording units of respective lengths on said recording medium; and recording management information to at least two locations of a logical volume, said management information including identification information indicating one of a plurality of respective types of information, the type of information including at least AV data and non-AV data, the type of information being determinative of the length of recording units used to record the information.

4. A recording medium for providing program which can be read by a computer for causing a recording and/or reproduction apparatus for recording and/or reproducing information onto and/or from a disc type recording medium to execute the steps of:

recording said data in recording units of respective length on the recording medium; and recording management information to at least two locations of a logical volume, said management information including identification information indicating one of a plurality of respective types of information, the type of information including at least AV data and non-AV data, the type of information being determinative of the length of recording units used to record the information.

* * * * *